United States Patent
Adamo et al.

(10) Patent No.: US 10,987,671 B2
(45) Date of Patent: Apr. 27, 2021

(54) RESERVOIR-BASED MANAGEMENT OF VOLUMETRIC FLOW RATE IN FLUIDIC SYSTEMS

(71) Applicant: Zaiput Flow Technologies LLC, Waltham, MA (US)

(72) Inventors: Andrea Adamo, Cambridge, MA (US); Robert Andrew Butters, Waltham, MA (US); Trevor Charles Murray, Boston, MA (US)

(73) Assignee: Zaiput Flow Technologies LLC, Waltham, MA (US)

( * ) Notice: Subject to any disclaimer, the term of this patent is extended or adjusted under 35 U.S.C. 154(b) by 91 days.

(21) Appl. No.: 16/376,974

(22) Filed: Apr. 5, 2019

(65) Prior Publication Data

US 2020/0316602 A1 Oct. 8, 2020

(51) Int. Cl.
*B01L 3/00* (2006.01)
*B01D 17/04* (2006.01)
*B01D 63/08* (2006.01)

(52) U.S. Cl.
CPC ........ *B01L 3/502769* (2013.01); *B01D 17/04* (2013.01); *B01D 63/087* (2013.01); *B01D 63/088* (2013.01); *B01L 2200/0673* (2013.01); *B01L 2200/0684* (2013.01); *B01L 2400/0487* (2013.01)

(58) Field of Classification Search
None
See application file for complete search history.

(56) References Cited

U.S. PATENT DOCUMENTS

| 9,927,038 B2 | 3/2018 | Adamo et al. |
| 2006/0216819 A1* | 9/2006 | Yasuda ................. C12M 23/16 435/288.5 |
| 2011/0184668 A1 | 7/2011 | Juchniewicz et al. |
| 2019/0314818 A1 | 10/2019 | Faltin et al. |

FOREIGN PATENT DOCUMENTS

| WO | WO 2004/082796 A2 | 9/2004 |
| WO | WO 2004/087283 A1 | 10/2004 |
| WO | WO 2007/006033 A2 | 1/2007 |
| WO | WO 2014/026098 A2 | 2/2014 |
| WO | WO 2018/086897 A1 | 5/2018 |

OTHER PUBLICATIONS

Extended European Search for EP App. No. 20168028.7 dated Aug. 10, 2020.
[No Author Listed], Multi-Stage Extraction Brochure. Zaiput Flow Technologies. 2018:6 pages.
[No Author Listed], Multi-Stage Extraction Brochure. Zaiput Flow Technologies. 2019:6 pages.

(Continued)

*Primary Examiner* — Richard C Gurtowski
(74) *Attorney, Agent, or Firm* — Wolf, Greenfield & Sacks, P.C.

(57) ABSTRACT

Reservoir-based management of volumetric flow rates in fluidic systems is generally described. Inventive systems and methods for liquid-liquid separations and/or liquid-gas separations are also described.

37 Claims, 11 Drawing Sheets

(56) References Cited

OTHER PUBLICATIONS

Adamo et al., Membrane-Based, Liquid-Liquid Separator with Integrated Pressure Control. Ind. Eng. Chem. Res. 2013;52:10802-8. Epub Jul. 3, 2013.
Peer et al., Biphasic catalytic hydrogen peroxide oxidation of alcohols in flow: Scale up and extraction. Org. Process Res. Dev. 2016;20(9):1677-85. Epub Aug. 9, 2016.
Sahoo et al., Multistep Continuous-Flow Microchemical Synthesis Involving Multiple Reactions and Separations. Angew. Chem. Int. Ed. 2007;46:5704-8.
Shen et al., Multistage extraction platform for highly efficient and fully continuous purification of nanoparticles. Nanoscale. 2017;9:7703-7. Epub May 23, 2017.
Weeranoppanant et al., Design of Multistage Counter-Current Liquid-Liquid Extraction for Small-Scale Applications. Ind. Eng. Chem. Res. 2017;56(14):4095-103. Epub Mar. 22, 2017.
EP 20168028.7, Aug. 10, 2020, Extended European Search Report.

* cited by examiner

RESERVOIR-BASED MANAGEMENT OF VOLUMETRIC FLOW RATE IN FLUIDIC SYSTEMS

TECHNICAL FIELD

Reservoir-based management of volumetric flow rate in fluidic systems, and associated methods, are generally described.

SUMMARY

Reservoir-based management of volumetric flow rate in fluidic systems is generally described. Inventive systems and methods for liquid-liquid separations and/or liquid-gas separations are also described. For example, in some embodiments, a reservoir (e.g., an enclosed reservoir) between an outlet of a fluidic separator and a pump can be used to manage volumetric flow rates in a multistage liquid-liquid extraction system. Certain exemplary systems and methods disclosed herein can be used, for example, in workup for organic synthesis, workup for inorganic synthesis, separation of biphasic mixtures, separation of emulsions, homogeneous catalyst recovery, liquid-liquid extraction, liquid-gas extraction, separation, recovery of pharmaceuticals, recovery of chemical compounds, separation of alcohols from organic solvents, and/or removal of excess starting materials. The subject matter of the present invention involves, in some cases, interrelated products, alternative solutions to a particular problem, and/or a plurality of different uses of one or more systems and/or articles.

Certain embodiments are related to fluidic systems.

In some embodiments, the fluidic system comprises a first fluidic separator; a second fluidic separator; a first fluidic pathway fluidically connected to the first fluidic separator and the second fluidic separator; and a second fluidic pathway fluidically connected to the first fluidic separator and the second fluidic separator, the second fluidic pathway comprising a first segment, a second segment, a pump, and a reservoir; wherein the reservoir is between the first segment and the second segment; wherein the pump is between the second segment and an inlet of the first fluidic separator; and wherein at least a portion of a wall of the reservoir is flexible.

In certain embodiments, the fluidic system comprises a first fluidic separator; a second fluidic separator; a first fluidic pathway fluidically connected to the first fluidic separator and the second fluidic separator; and a second fluidic pathway fluidically connected to the first fluidic separator and the second fluidic separator, the second fluidic pathway comprising a first segment, a second segment, a pump, and an enclosed reservoir; wherein the enclosed reservoir is between the first segment and the second segment; wherein the pump is between the second segment and an inlet of the first fluidic separator; and wherein the maximum cross-sectional dimension of the enclosed reservoir is at least 3 times larger than the average of the maximum cross-sectional dimensions of the portions of the second fluidic pathway immediately upstream of the enclosed reservoir and immediately downstream of the enclosed reservoir.

The fluidic system comprises, in certain embodiments, a first fluidic separator; a second fluidic separator; a first fluidic pathway fluidically connected to the first fluidic separator and the second fluidic separator; and a second fluidic pathway fluidically connected to the first fluidic separator and the second fluidic separator, the second fluidic pathway comprising a first segment, a second segment, a pump, and an enclosed reservoir; wherein the enclosed reservoir is between the first segment and the second segment; wherein the pump is between the second segment and an inlet of the first fluidic separator; and wherein the enclosed reservoir is configured such that, during use, the volumetric flow rate of fluid within the first segment of the second fluidic pathway is decoupled from the volumetric flow rate of fluid within the second segment of the second fluidic pathway.

Certain aspects are related to methods of operating fluidic systems.

In some embodiments, a method of operating a fluidic system comprising a first fluidic separator and a second fluidic separator comprises transporting fluid from a first outlet of the second fluidic separator, through a fluidic pathway comprising a first segment, a reservoir, a second segment, and a pump, and to an inlet of the first fluidic separator, wherein at least a portion of a wall of the reservoir is flexible.

In certain embodiments, a method of operating a fluidic system comprising a first fluidic separator and a second fluidic separator comprises transporting fluid from a first outlet of the second fluidic separator, through a fluidic pathway comprising a first segment, an enclosed reservoir, a second segment, and a pump, and to an inlet of the first fluidic separator, wherein the maximum cross-sectional dimension of the enclosed reservoir is at least 3 times larger than the average of the maximum cross-sectional dimensions of the portions of the fluidic pathway immediately upstream of the enclosed reservoir and immediately downstream of the enclosed reservoir.

In some embodiments, a method of operating a fluidic system comprising a first fluidic separator and a second fluidic separator comprises transporting fluid from a first outlet of the second fluidic separator, through a fluidic pathway comprising a first segment, an enclosed reservoir, a second segment, and a pump, and to an inlet of the first fluidic separator, wherein the enclosed reservoir decouples a volumetric flow rate within the first segment of the fluidic pathway from a volumetric flow rate within the second segment of the fluidic pathway.

Certain aspects are related to reservoir units.

In some embodiments, the reservoir unit comprises a reservoir associated with a sensor; wherein the reservoir is flexible; and wherein the sensor is configured to detect the inflation status of the reservoir and to output a signal indicative of the inflation status of the reservoir.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

Figure 1A:
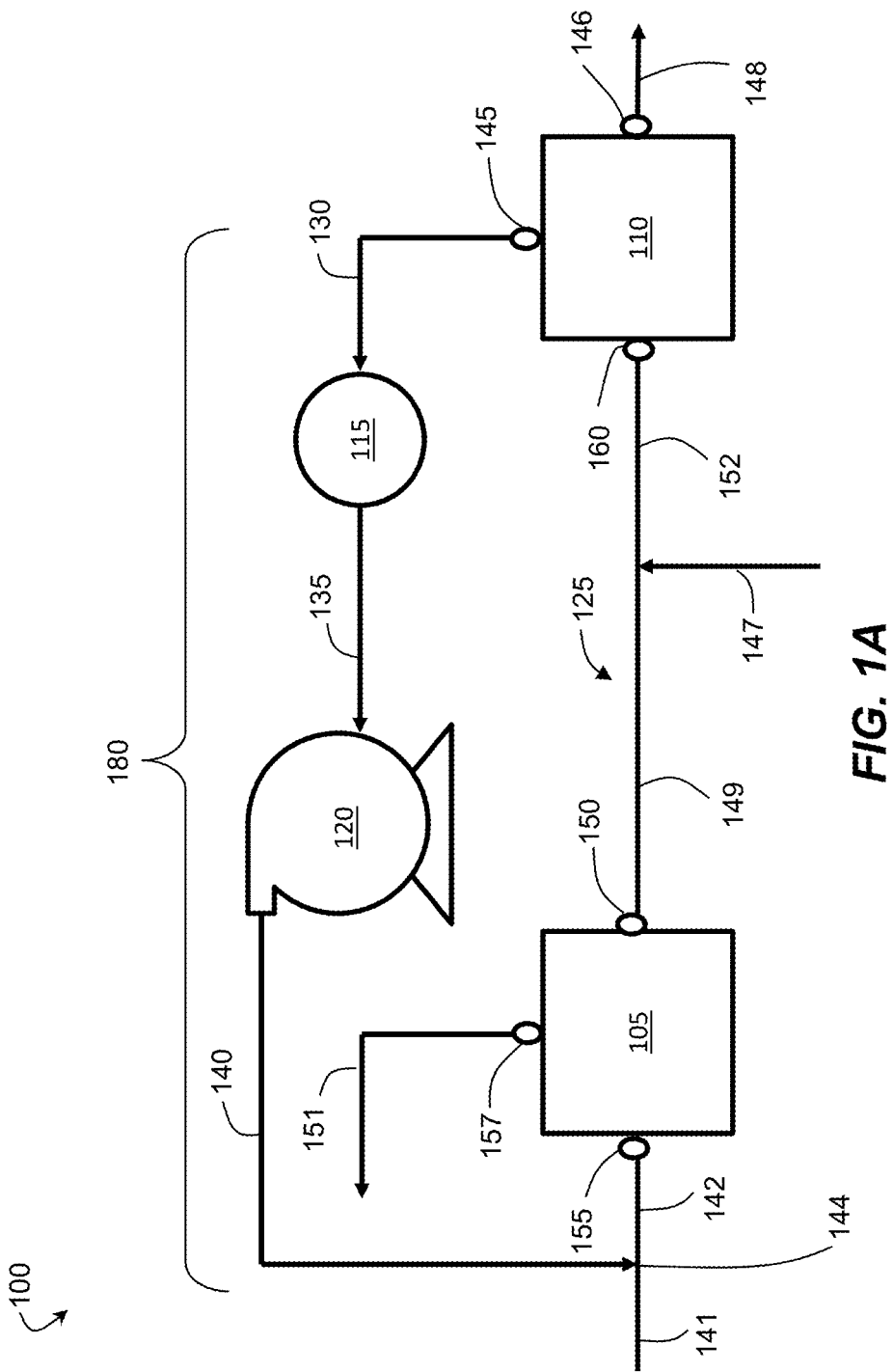
FIG. 1A is, in accordance with certain embodiments, a schematic illustration of a portion of a system comprising two fluidic separators.

Disclosed herein are fluidic systems employing reservoir-based management of volumetric flow rate and associated methods. In some embodiments, the fluidic systems described herein comprise multiple interconnected fluidic separators. The fluidic separators can comprise more outlets (e.g., two outlets) than inlets (e.g., one inlet), such that a fluidic input comprising multiple different components can be separated into multiple streams, each enriched in one of the components relative to the fluidic input.

In accordance with certain embodiments, after the separation of an input stream into multiple output streams, the output streams have volumetric flow rates that are different from the volumetric flow rate of the input stream. Volumetric flow rate inconsistencies, in certain cases, could have negative effects on the system. For example, if fluid from one of the outlets is recycled to an inlet of an upstream fluidic separator, as it is in some embodiments disclosed herein, the volumetric flow rate from the outlet may not be sufficient for proper operation of the upstream separator. Such volumetric flow rate inconsistency could, in some instances, cause negative effects, such as damage to the fluidic system, disruption in separations, and/or reduced quality separations. For example, as will be discussed in further detail below, some fluidic separators require a minimum amount of pressure for the separation to take place, such that the separations will stop or be of reduced quality if that minimum pressure/volumetric flow rate is not satisfied. Accordingly, if a pump pulls too much fluid from a downstream separator or is not able to supply enough fluid to an upstream separator, the downstream or upstream separators, respectively, may not function properly. Thus, consistently maintaining the desired volumetric flow rates and/or pressures at specific portions of the fluidic system, such as at inlets and outlets of fluidic separators, is important in many cases.

One possible method to control volumetric flow rates is to use a combination of pumps and sensors. For example, sensors could be installed within the walls of the conduits of the fluidic system and configured to send signals to a controller which, in turn, can adjust the speed of a pump being used to transport fluid from an outlet of a downstream separator to an inlet of an upstream separator. However, even with the use of pumps and sensors, it may still be challenging to control the volumetric flow rates both upstream and downstream of the pump in a recycled stream. In certain embodiments, a reservoir may be used to decouple the volumetric flow rate upstream of the reservoir from the volumetric flow rate downstream of the reservoir. In some embodiments, the reservoir may provide a buffer of fluid for the pump to draw from, such that the volumetric flow rate coming from the outlet of one separator connected upstream of the pump need not be the same as the volumetric flow rate going into the inlet of another separator connected downstream of the pump. Such a reservoir can allow one to recycle fluid from the outlet of a downstream separator to an inlet of an upstream separator such that the volumetric flow rate entering the upstream separator is different from the volumetric flow rate exiting the downstream separator, without employing additional fluidic connections (e.g., makeup streams and/or bleed streams). Additional details regarding the properties and operation of the reservoir are provided below.

Figure 1B:
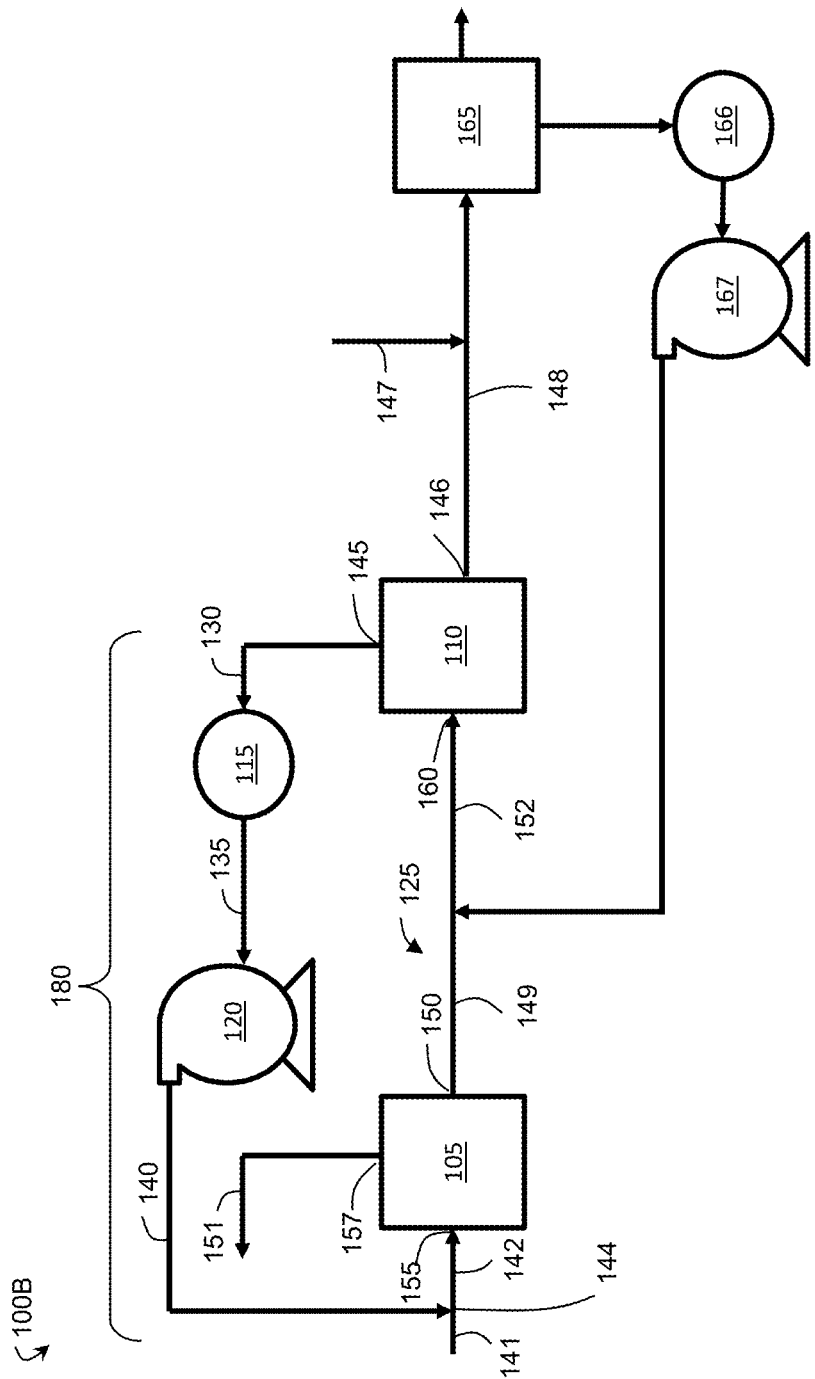
FIG. 1B is, in accordance with certain embodiments, a schematic illustration of a portion of a system comprising three fluidic separators.
Figure 1C:
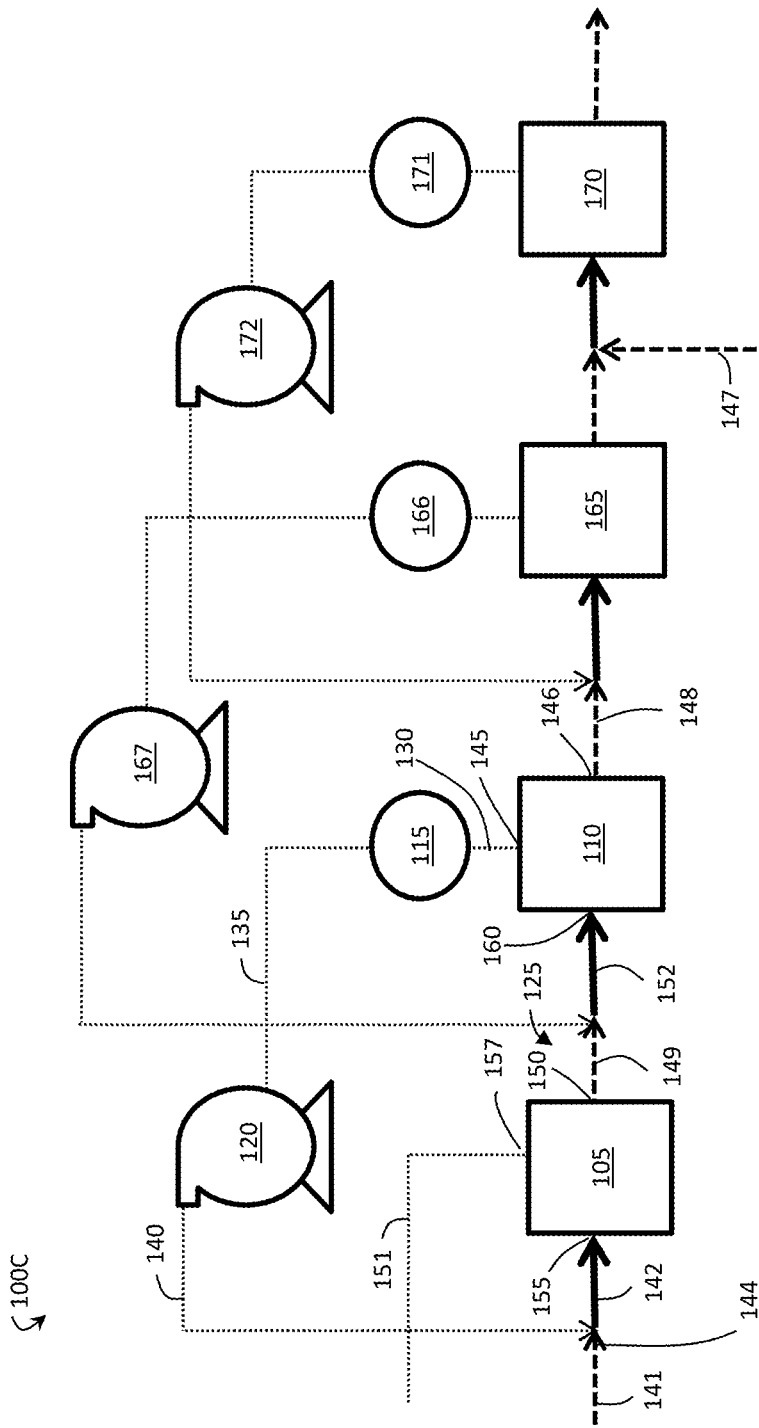
FIG. 1C is, in accordance with certain embodiments, a schematic illustration of a portion of a system comprising four fluidic separators.

Certain aspects are related to fluidic systems and methods of operating fluidic systems. Non-limiting examples of such fluidic systems are shown in FIGS. 1A-1C. Exemplary methods of operating certain fluidic systems are described in relation to FIGS. 1A-1C. While the inventive methods described herein may be used in association with the system embodiments described herein (or combinations thereof), the inventive methods are not necessarily so limited and could be used with other exemplary fluidic systems.

In some embodiments, the system comprises a first fluidic separator. For example, in FIG. 1A, system 100 comprises first fluidic separator 105. The fluidic separators disclosed herein are generally configured such that, during operation, the fluidic separator takes in a mixture of two or more components (e.g., a suspension of two or more components, an emulsion of two or more components, mixed solvents, slugs of one liquid in another, and/or bubbles of a gas in a liquid), produces a first product stream that is enriched in one of the components relative to the inlet stream, and produces a second product stream that is enriched in another of the components relative to the inlet stream. Additional detail regarding the properties and operation of exemplary fluidic separators described herein is provided below.

The first fluidic separator, in some cases, comprises a first outlet and a second outlet. For example, in FIG. 1A, first fluidic separator 105 comprises first outlet 157 and second outlet 150. In some cases, the first fluidic separator comprises additional outlets. For example, the first fluidic separator may comprise three or more outlets, four or more outlets, or five or more outlets. In certain examples, the first fluidic separator may comprise five or fewer outlets, four or fewer outlets, three or fewer outlets, or two outlets. Combinations of these ranges are also possible.

In certain embodiments, the system comprises a second fluidic separator. For example, in FIG. 1A, system 100 comprises second fluidic separator 110. The second fluidic separator, in certain cases, comprises a first outlet and a second outlet. For example, in FIG. 1A, second fluidic separator 110 comprises first outlet 145 and second outlet 146. In some cases, the second fluidic separator comprises additional outlets. For example, the second fluidic separator may comprise three or more outlets, four or more outlets, or five or more outlets. In certain examples, the second fluidic separator may comprise five or fewer outlets, four or fewer outlets, three or fewer outlets, or two outlets. Combinations of these ranges are also possible.

According to some embodiments, the system comprises a first fluidic pathway fluidically connected to the first fluidic separator and the second fluidic separator. For example, in FIG. 1A, fluidic pathway 125 is connected to first fluidic separator 105 and second fluidic separator 110. In some cases, the second outlet of the first fluidic separator is fluidically connected to the first fluidic pathway and an inlet of the second fluidic separator. For example, in FIG. 1A, second outlet 150 of first fluidic separator 105 is fluidically connected to fluidic pathway 125 and inlet 160 of second fluidic separator 110. In certain embodiments, the first fluidic pathway can be used to transport fluid from an outlet of an upstream fluidic separator to an inlet of a downstream fluidic separator, for example, for further separation. For example, in FIG. 1A, fluidic pathway 125 can be used, in some embodiments, to transport fluid from second outlet 150 of first fluidic separator 105 to inlet 160 of second fluidic separator 110.

In some instances, the second outlet of the first fluidic separator is directly fluidically connected to the inlet of the second fluidic separator with nothing in between them except for the first fluidic pathway (or another fluidic connection). In other instances, the second outlet of the first fluidic separator is connected indirectly to the inlet of the second fluidic separator with unit operation(s) (e.g., filter(s), reactor(s), and/or fluidic separator(s)) in between them, such that the first fluidic pathway may have multiple segments (e.g., a first segment and a second segment of the first fluidic pathway).

In accordance with certain embodiments, the system comprises a second fluidic pathway fluidically connected to the first fluidic separator and the second fluidic separator. For example, in FIG. 1A, fluidic pathway 180 (which includes segments 130, 135, and 140) is fluidically connected to first fluidic separator 105 and second fluidic separator 110. In certain instances, the first outlet of the second fluidic separator is fluidically connected to the second fluidic pathway. For example, in FIG. 1A, first outlet 145 of second fluidic separator 110 is fluidically connected to fluidic pathway 180.

As noted above, in addition to inventive fluidic systems, inventive methods of operating fluidic systems are also described. In some embodiments, the method comprises transporting fluid from a first outlet of the second fluidic separator, through a fluidic pathway and to an inlet of the first fluidic separator. For example, in FIG. 1A, fluid is transported from first outlet 145 of second fluidic separator 110 through fluidic pathway 180 to inlet 155 of first fluidic separator 105. In some embodiments, the second fluidic pathway (or equivalent) allows recycling of fluid from one outlet of the second fluidic separator (or equivalent downstream fluidic separator) to be fed back into an inlet of the first fluidic separator (or equivalent upstream fluidic separator). In certain cases, this recycling (e.g., flowing from the second fluidic separator to the first fluidic separator) of a fluid (e.g., an extractant) allows multiple rounds of separation/extraction (e.g., in situations where one separation/extraction may not be sufficient) while minimizing the volume of fluid (e.g., an extractant) to be used, as described in more detail below.

In some embodiments, the second fluidic pathway comprises multiple segments. For example, in some cases, the second fluidic pathway comprises a first segment and a second segment. For example, in FIG. 1A, fluidic pathway 180 comprises first segment 130 and second segment 135.

The second fluidic pathway, in certain cases, comprises a pump. For example, in FIG. 1A, fluidic pathway 180 comprises pump 120. The pump is generally configured such that, during operation, the pump drives fluid flow from an outlet of a downstream fluidic separator (e.g., from the first outlet of the second fluidic separator) to an inlet of an upstream fluidic separator (e.g., the inlet of the first fluidic separator). Additional description regarding the properties and operation of exemplary pumps is provided below.

The second fluidic pathway, in some embodiments, comprises a reservoir. For example, in FIG. 1A, fluidic pathway 180 comprises reservoir 115. In certain embodiments, the reservoir is an enclosed reservoir. For the purposes of the present disclosure, a reservoir that is enclosed is one having an interior that is not directly exposed to the environment around the reservoir. It should be understood, however, that an enclosed reservoir may have inlets and outlets through which fluid can be transported into and out of, respectively, the reservoir. Accordingly, a reservoir may have one or more inlets or outlets and still constitute an enclosed reservoir. The use of an enclosed reservoir can, in certain but not necessarily all embodiments, provide advantages over the use of reservoirs that are open to the atmosphere, such as break tanks. For example, the use of an enclosed reservoir can reduce the risk of contamination, reduce the risk of evaporation, and/or reduce the risk of leakage.

In some embodiments, the reservoir may be associated with other components, such as a housing, a sensor unit (e.g., a sensor and a stimulus that can be detected by the sensor), and the like. In such instances, the "reservoir" is the part that contains the fluid. The reservoir and its associated components (e.g., housing, sensor unit(s), etc.) are referred to herein, collectively, as the "reservoir unit."

In accordance with some embodiments, the reservoir is configured such that, during use, the volumetric flow rate of fluid, and/or the pressure, in the portions of the second fluidic pathway immediately upstream of the reservoir (e.g., the first segment of the second fluidic pathway) is decoupled from the volumetric flow rate of fluid, and/or the pressure, in the portions of the second fluidic pathway immediately downstream of the reservoir (e.g., the second segment of the second fluidic pathway). For example, in accordance with certain embodiments, the reservoir is configured such that, during use, the volumetric flow rate of fluid within the first segment of the second fluidic pathway is decoupled from the volumetric flow rate of fluid within the second segment of the second fluidic pathway. Referring to FIG. 1A, for example, reservoir 115 can be configured such that, during use, the volumetric flow rate of fluid within first segment 130 of second fluidic pathway 180 is decoupled from the volumetric flow rate of fluid within second segment 135 of second fluidic pathway 180.

In certain embodiments, when the volume of the reservoir is shrinking, the volumetric flow rate downstream of the reservoir is greater than the volumetric flow rate upstream of the reservoir, whereas when the volume of the reservoir is expanding, the volumetric flow rate downstream of the reservoir is smaller than the volumetric flow rate upstream of the reservoir.

In some embodiments, the volumetric flow rate downstream of the reservoir is at least 2% greater, at least 5% greater, at least 10% greater, or at least 25% greater than the volumetric flow rate upstream of the reservoir during at least one period of time. In certain embodiments, the volumetric flow rate upstream of the reservoir is at least 2% greater, at least 5% greater, at least 10% greater, or at least 25% greater than the volumetric flow rate downstream of the reservoir during at least one period of time. Percentage increases in flow rate are calculated based on the lower volumetric flow rate. For example, if the volumetric flow rate upstream is 10 mL/min and the volumetric flow rate downstream is 12 mL/min, the volumetric flow rate downstream is 20% greater, as the difference between the two volumetric flow rates is 2 mL/min, which is 20% of the lower of the two flow rates (i.e., 10 mL/min). As another example, if the volumetric flow rate downstream is 12 mL/min and the volumetric flow rate upstream is 15 mL/min, then the volumetric flow rate upstream is 25% greater, as the difference between the two volumetric flow rates is 3 mL/min, which is 25% of the lower of the two flow rates (i.e., 12 mL/min).

It should be understood that the volumetric flow rates upstream and downstream of the reservoir can fluctuate over time. In some instances, variation of flow rates into and/or out of the reservoir can be observed. Such variations can be observed due to, for example, an uneven distribution of the phases within the flow, lack of steady state conditions, variations in pumping conditions (e.g., variations in the pressure applied by the pump, variations in the time over which pump pressure is applied, etc.), and the like.

In certain embodiments, the average volumetric flow rate downstream of the reservoir over a period of 30 minutes is within 5% (or within 2%, or within 1%) of the average volumetric flow rate upstream of the reservoir over the same 30 minute period.

The reservoir can be configured such that, during operation, a desired volumetric flow rate can be pumped (and/or a desired pressure can be achieved) without having the downstream separator negatively impact the upstream separator. Additional description regarding exemplary reservoirs, and operation thereof, is provided below.

In some instances, the second fluidic pathway comprises unit operation(s) (e.g., filter(s), reactor(s), and/or fluidic separator(s)) in addition to the first segment, second segment, pump, and reservoir. In other instances, the second fluidic pathway does not contain any unit operations in addition to the first segment, second segment, pump, and reservoir.

According to some embodiments, the first segment is directly fluidically connected to the first outlet of the second fluidic separator and to the reservoir. For example, in FIG. 1A, first segment 130 is directly fluidically connected to first outlet 145 of second fluidic separator 110 and reservoir 115. In other embodiments, the first segment is indirectly fluidically connected to the first outlet of the second fluidic separator and/or to the reservoir. For example, in some cases, there may be an additional unit operation(s) (e.g., filter(s), reactor(s), and/or fluidic separator(s)) in between the first outlet of the second fluidic separator and the reservoir that result in an indirect fluidic connection. In certain cases, the reservoir is between the first segment and the second segment. For example, in FIG. 1A, reservoir 115 is between first segment 130 and second segment 135.

In accordance with some embodiments, the second segment is directly fluidically connected to the reservoir and the pump. For example, in FIG. 1A, second segment 135 is directly fluidically connected to reservoir 115 and pump 120. In other embodiments, the second segment is indirectly fluidically connected to the reservoir and the pump. For example, in some cases, there may be an additional unit operation(s) (e.g., filter(s), reactor(s), and/or fluidic separator(s)). In some instances, the pump is between the second segment and an inlet of the first fluidic separator that result in an indirect fluidic connection. For example, in FIG. 1A, pump 120 is between second segment 135 and inlet 155 of first fluidic separator 105.

In certain embodiments, the second fluidic pathway further comprises a third segment. For example, in FIG. 1A, fluidic pathway 180 further comprises third segment 140. In some cases, the third segment is directly fluidically connected to the pump and is connected to the inlet of the first fluidic separator. For example, in FIG. 1A, third segment 140 is directly fluidically connected to pump 120 and is connected to inlet 155 of first fluidic separator 105. In other embodiments, the third segment is directly fluidically connected to both the pump and the inlet of the first fluidic separator, directly fluidically connected to the inlet of the first fluidic separator and indirectly fluidically connected to the pump, or is indirectly fluidically connected to the pump and the inlet of the first fluidic separator. For example, in some cases, there may be an additional unit operation(s) (e.g., filter(s), reactor(s), and/or fluidic separator(s)) in between the pump and the inlet of the first fluidic separator that result in an indirect fluidic connection.

Figure 2:
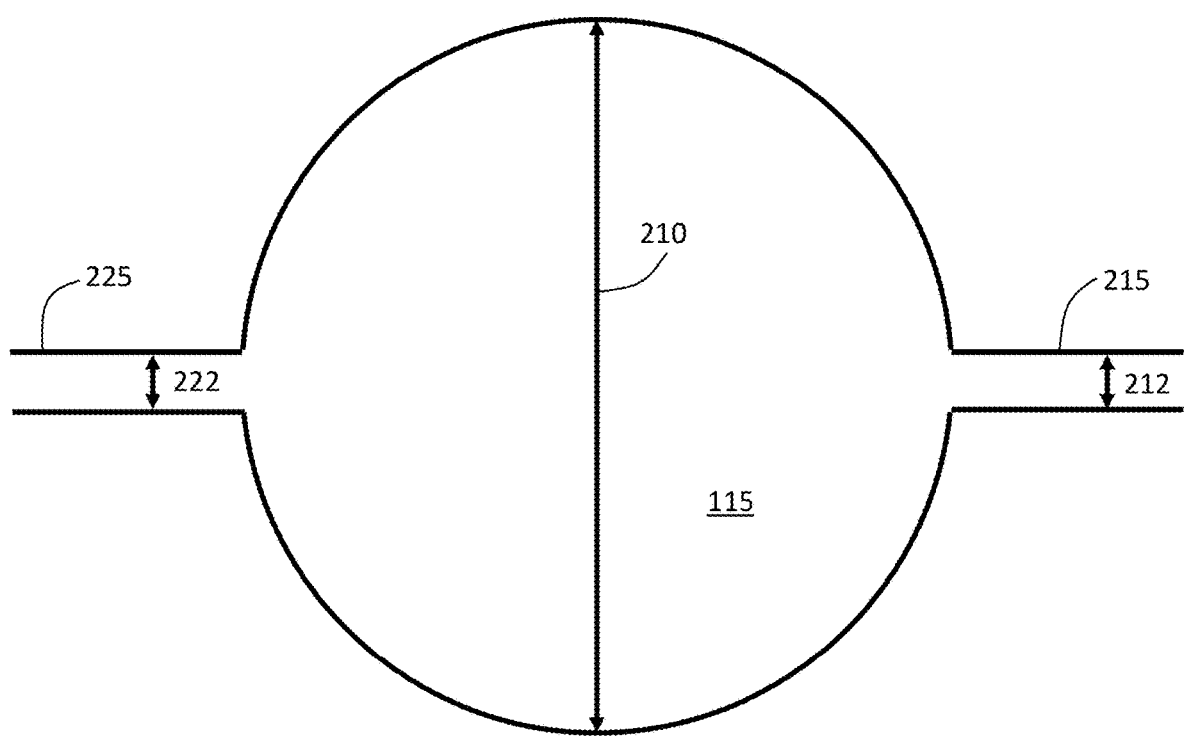
FIG. 2 is a schematic illustration of an exemplary reservoir, in accordance with some embodiments.

The reservoir can be configured to have a relatively large cross-sectional dimension compared to portions of the system that are immediately upstream and downstream of the reservoir, in some embodiments. For the purposes of the present disclosure, the maximum cross-sectional dimension of the reservoir is measured from an interior wall portion, through the fluid within the reservoir, and to the opposite wall portion. In addition, the maximum cross-sectional dimension of the reservoir is measured when the reservoir is in its filled state. A reservoir is considered to be in its "filled state" when it has been filled with water (but not so filled that it is elastically deformed) at 25° C. and 1 atm of external pressure, and the pressure inside the reservoir is equal to the pressure outside the reservoir. Also, the maximum cross-sectional dimension of the reservoir is measured in a direction perpendicular to the flow of fluid through the reservoir. An exemplary measurement of the maximum cross-sectional dimension of a reservoir is shown in FIG. 2, in which reservoir 115 (which is shown as being full but not elastically deformed) has maximum cross-sectional dimension 210. As shown in FIG. 2, maximum cross-sectional dimension 210 is substantially larger than the maximum cross-sectional dimension 212 of portion 215 of the fluidic pathway immediately downstream of reservoir 115 (which, like the maximum cross-sectional dimension of the reservoir is also measured from an interior wall portion, through the fluid, and to an opposite wall portion). In addition, in FIG. 2, maximum cross-sectional dimension 210 is substantially larger than the maximum cross-sectional dimension 222 of portion 225 of the fluidic pathway immediately upstream of reservoir 115 (which, like the maximum cross-sectional dimension of the reservoir is also measured from an interior wall portion, through the fluid, and to an opposite wall portion).

In certain embodiments, the maximum cross-sectional dimension of the reservoir is at least 3 times larger, at least 5 times larger, or at least 10 times larger than the average of the maximum cross-sectional dimensions of the portions of the second fluidic pathway immediately upstream of the reservoir (e.g., the first segment) and immediately downstream of the reservoir (e.g., the second segment). To provide an exemplary calculation, referring to FIG. 2, if maximum cross-sectional dimension 210 is 10 cm, if maximum cross-sectional dimension 222 is 0.75 cm, and if maximum cross-sectional dimension 212 is 1.25 cm, then the maximum cross-sectional dimension of reservoir 115 (10 cm) would be 10 times larger than the average (1.0 cm) of maximum cross-sectional dimension 212 (1.25 cm) and maximum cross-sectional dimension 222 (0.75 cm). In some embodiments, the maximum cross-sectional dimension of the reservoir is less than or equal to 15 times larger, less than or equal to 12 times larger, less than or equal to 10 times larger, less than or equal to 7 times larger, or less than or equal to 5 times larger than the average of the maximum cross-sectional dimensions of the portions of the second fluidic pathway immediately upstream of the reservoir (e.g., the first segment) and immediately downstream of the reservoir (e.g., the second segment). Combinations of these ranges are also possible (e.g., 3-7 times larger).

In some embodiments, the maximum cross-sectional dimension of the reservoir is at least 2 millimeters (mm), at least 5 millimeters (mm), at least 10 millimeters (mm), at least 25 millimeters (mm), at least 50 millimeters (mm), or at least 100 millimeters (mm). In certain embodiments, the maximum cross-sectional dimension of the reservoir is less than or equal to 500 millimeters (mm), less than or equal to 250 millimeters (mm), less than or equal to 100 millimeters (mm), less than or equal to 50 millimeters (mm), less than or equal to 25 millimeters (mm), or less than or equal to 10 millimeters (mm). Combinations of these ranges are also possible (e.g., 10-100 millimeters (mm)).

Figure 3A:
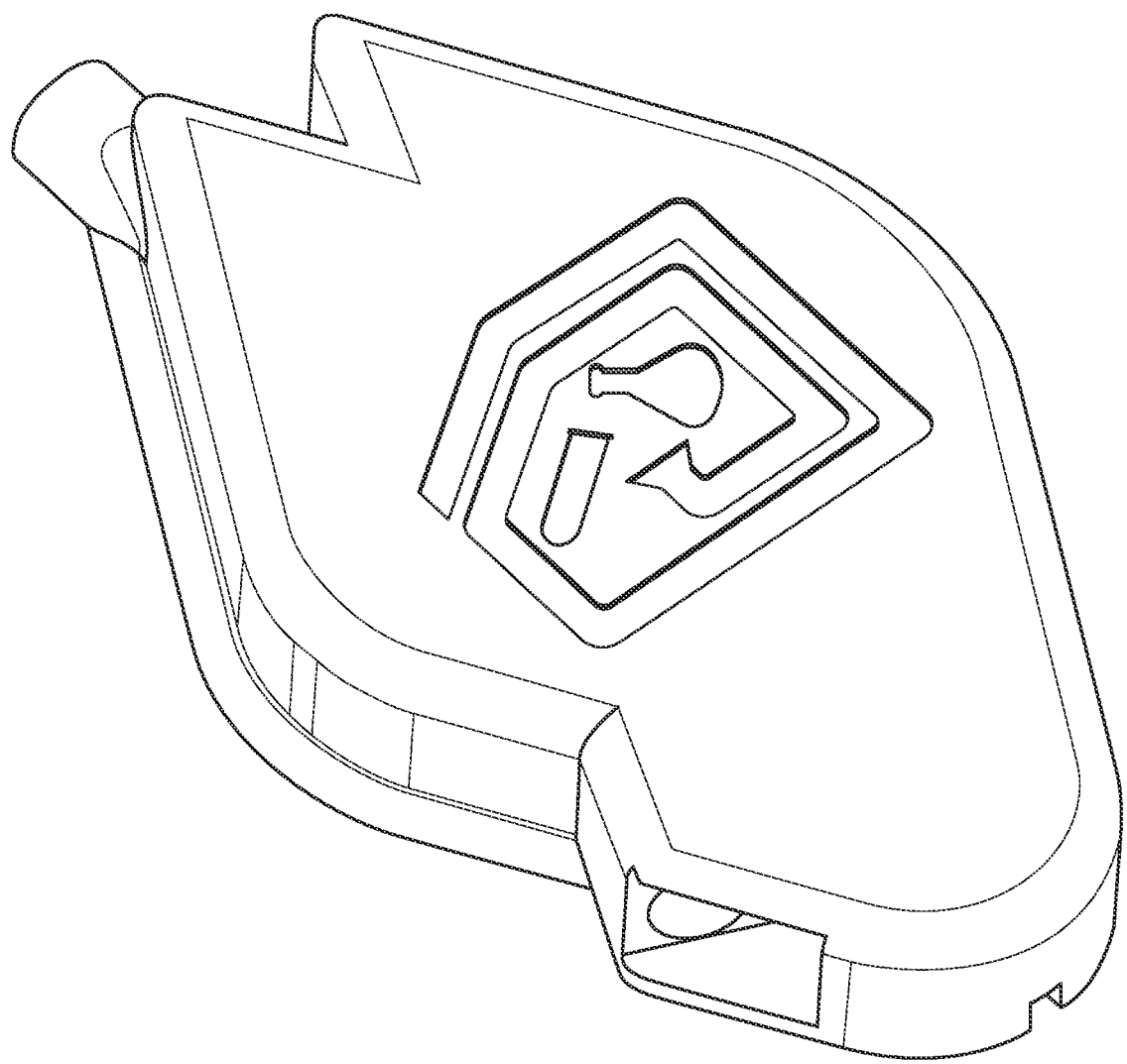
FIG. 3A is, in accordance with certain embodiments, a perspective view schematic illustration of a reservoir unit.
Figure 3B:
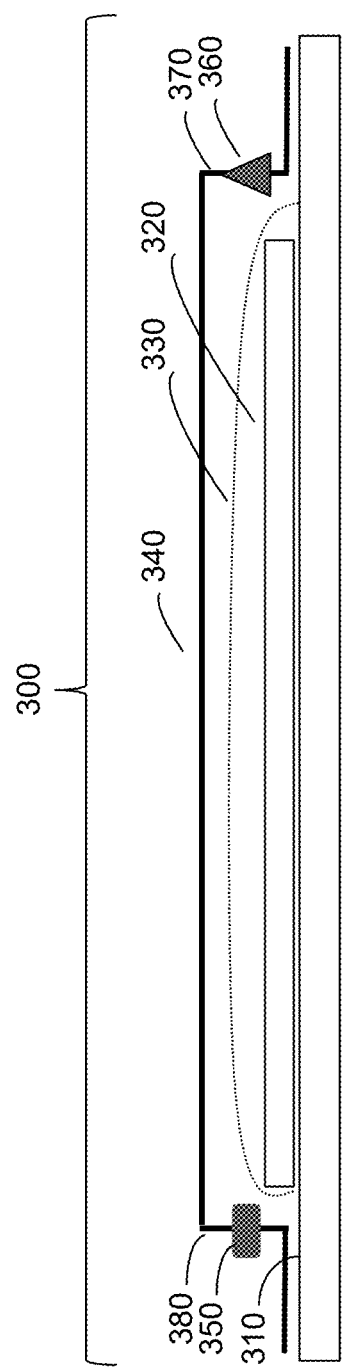
FIG. 3B is, in accordance with certain embodiments, a schematic illustration of a reservoir unit.

As noted above, according to certain embodiments, the reservoir may be associated with other components to form a reservoir unit. One exemplary embodiment of a reservoir unit is shown in FIGS. 3A and 3B. In FIG. 3B, reservoir unit 300 comprises reservoir 320 associated with elastomer 330, bottom lead 310, housing 340, sensor 360 on first side 370 of the reservoir unit/reservoir, and stimulus 350 (e.g., a light source) on second side 380 of the reservoir unit/reservoir.

According to some embodiments, at least a portion (e.g., at least 10 wt %, at least 50 wt %, at least 75 wt %, at least 90 wt %, or all) of a wall of the reservoir is flexible. For example, in FIG. 3B, reservoir 320 is a deformable bag. In some cases, the entire reservoir is flexible. As used herein, an entirety of a reservoir is considered to be flexible when the entire portion of the reservoir that is in contact with fluid is flexible. For example, in some embodiments, the reservoir may be a flexible vessel (in which the fluid is stored) which is itself enclosed on one or more sides by a rigid housing. In such a case, the entire reservoir would still be considered to be flexible, even though the housing that encloses the reservoir is rigid. As a non-limiting example, in FIG. 3B, the entirety of reservoir 320 would still be considered to be flexible when it is a deformable bag formed entirely of flexible material even when housing 340 is inflexible.

The use of flexible walls or flexible wall portions in the reservoir can allow for the reservoir to expand or contract in volume during operation. Such expansion and contraction of the reservoir can allow for the decoupling of volumetric flow rates upstream and downstream of the reservoir. For example, as noted above, in some cases, the pump can be operated such that the volumetric flow rate of the fluid downstream of the reservoir is larger than the volumetric flow rate of the fluid upstream of the reservoir, which can cause the reservoir to shrink in volume. Also, in some cases, the pump can be operated such that the volumetric flow rate of the fluid downstream of the reservoir is smaller than the volumetric flow rate of the fluid upstream of the reservoir, which can cause the reservoir to expand in volume. In certain cases, all or a portion of the wall of the reservoir can be sufficiently flexible such that the reservoir is capable of being in a state, when the pressure inside the reservoir is equal to the pressure outside the reservoir, in which the volume of the reservoir is reduced by at least 10%, at least 25%, at least 50%, at least 75%, at least 90%, or more, relative to the volume of the reservoir in its filled state.

Additionally, in some embodiments, the use of flexible walls or flexible wall portions can reduce or eliminate the need for air venting, which can be undesirable due to possible loss of mass, evaporation, and/or contamination.

In certain embodiments, at least a portion (e.g., at least 10 wt %, at least 50 wt %, at least 75 wt %, at least 90 wt %, or all) of the reservoir is removable from the fluidic system.

In some cases, at least a portion (e.g., at least 10 wt %, at least 50 wt %, at least 75 wt %, at least 90 wt %, or all) of the reservoir is disposable. In certain cases, at least a portion (e.g., at least 10 wt %, at least 50 wt %, at least 75 wt %, at least 90 wt %, or all) of the reservoir is washable.

In accordance with some embodiments, the reservoir is a bag. For example, in FIG. 3B, reservoir 320 can be a deformable bag.

In some instances, the reservoir comprises plastic. In some embodiments, the reservoir comprises perfluorinated polymer, perfluoroalkoxy (PFA), latex, polytetrafluoroethylene (PTFE), fluorinated ethylene propylene (FEP), fluoroelastomers (FMK), perfluoro-elastomers (FFKM), tetrafluoro ethylene/propylene rubbers (FEPM), polyvinylidene fluoride (PVDF), ethylene tetrafluoroethylene (ETFE), neoprene, nitrile rubber, polyethylene, metal (e.g., metal films), ceramic, glass, and/or combinations thereof. As one non-limiting example, in FIG. 3B, reservoir 320 can be a deformable bag comprising perfluorinated polymer. In certain instances, at least a portion (e.g., at least 10 wt %, at least 50 wt %, at least 75 wt %, at least 90 wt %, or all) the reservoir is plastic.

Figure 3C:
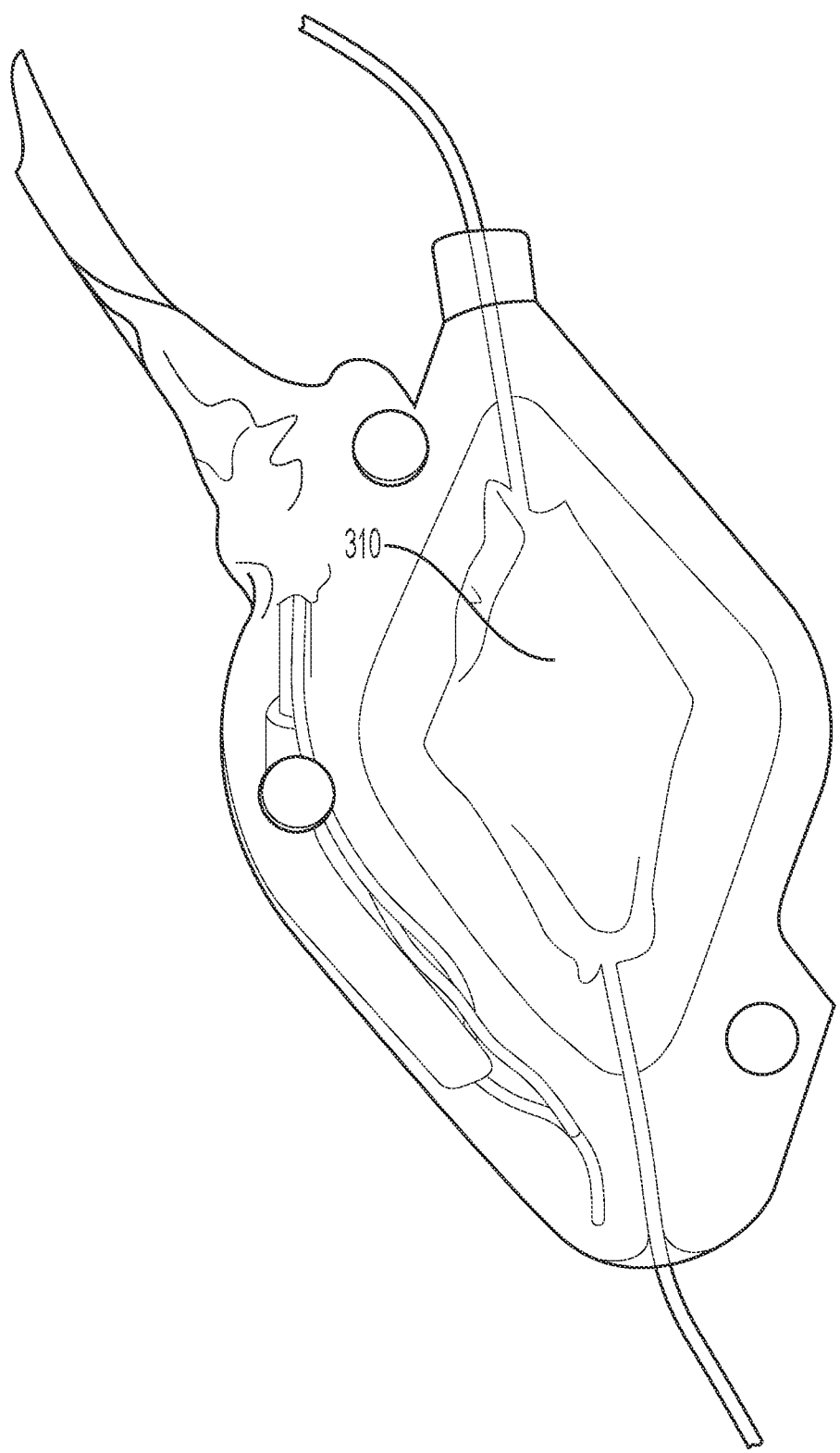
FIG. 3C is, in accordance with certain embodiments, a schematic of the bottom of a reservoir unit, wherein a bottom layer is transparent, such that the contents of the enclosed reservoir are visible.

In certain cases, at least a portion (e.g., at least 10 wt %, at least 50 wt %, at least 75 wt %, at least 90 wt %, or all) of the reservoir unit (e.g., enclosure of the reservoir unit) is transparent. For example, in FIG. 3C, bottom lead 310 of the reservoir unit is transparent. In certain cases, at least a portion (e.g., at least 10 wt %, at least 50 wt %, at least 75 wt %, at least 90 wt %, or all) of the reservoir (e.g., reservoir 320 in FIG. 3B) is transparent. An article is considered to be transparent to a particular wavelength of electromagnetic radiation if it allows for the transmission of at least a portion (e.g., at least 10%, at least 25%, at least 50%, or more) of that wavelength of electromagnetic radiation. In some embodiments, at least a portion of the reservoir unit and/or the reservoir is transparent to at least one wavelength of electromagnetic radiation between 10 nm to 10 micrometers. In some embodiments, at least a portion of the reservoir unit and/or the reservoir is transparent to at least one wavelength of visible light (i.e., electromagnetic radiation having a wavelength of from 400 nm to 750 nm). In some embodiments, at least a portion of the reservoir unit and/or the reservoir is transparent to at least one wavelength of electromagnetic radiation that a sensor associated with the reservoir is capable of detecting and/or configured to detect.

In certain embodiments, the reservoir is associated with a sensor configured to detect the inflation status of the reservoir. This can be accomplished in any of a number of ways. For example, in some embodiments, the sensor may measure flow (e.g., the sensor may measure and/or track the inflow and outflow). In some cases, the sensor may track the movement of one or more walls of the reservoir. In certain instances, the sensor may measure stress or strain of one or more walls of the reservoir. In certain embodiments, the sensor may measure an absolute value of size and/or volume of the reservoir. In some instances, the sensor may measure multiple absolute values of size and/or volume of the reservoir over time, such that the sensor, another device, or a human may calculate a change in size and/or volume of the reservoir. In certain cases, the sensor may measure a change in size and/or volume of the reservoir. In some embodiments, the sensor is configured to detect the inflation status of the reservoir by interacting with a stimulus that can be detected by the sensor. According to some embodiments, the sensor is configured to measure electric capacitance to detect the inflation status of the reservoir. In accordance with certain embodiments, the sensor is configured to measure ultrasonic frequencies. In certain embodiments, the sensor is configured to sense light to detect the inflation status of the reservoir.

In some embodiments, the sensor comprises a light-sensitive component. For example, in FIG. 3B, the reservoir unit comprises sensor 360 (which can be a light-sensitive component). In some embodiments, the light-sensitive component may comprise a photodiode, a phototransistor, a photoresistor, a solar cell, and/or a charge coupled device (CCD). In certain instances, the stimulus comprises a light source. For example, in FIG. 3B, the reservoir unit comprises stimulus 350, which can be a light source. Examples of light sources include light bulbs, LED lights, and/or lasers. For example, in certain cases, the sensor comprises a light-sensitive component on a first side of the reservoir and a light source on a second side of the reservoir. For example, in FIG. 3B, the reservoir unit comprises sensor 360 (which can be a light-sensitive component) on first side 370 of the reservoir unit and stimulus 350 (which can be a light source) on second side 380 of the reservoir unit.

According to certain embodiments, the reservoir may be associated with other components (such as those described above, or elsewhere herein), forming a reservoir unit. In some instances, the reservoir unit comprises a reservoir associated with a sensor, wherein the reservoir is flexible, and wherein the sensor is configured to detect the inflation status of the reservoir and to output a signal indicative of the inflation status of the reservoir.

In certain cases, the inflation status of the reservoir, as detected by the sensor, can be used to determine appropriate pump settings. For example, if the reservoir is determined to be relatively highly inflated, the reservoir unit may output a signal indicating that the pump can be run on a high setting, as there is sufficient fluid contained within the reservoir from which the pump can draw. In contrast, in some examples, if the reservoir is determined to be relatively deflated, the reservoir unit may output a signal indicating that the pump should be run at a lower setting so that it does not deplete the fluid contained within the reservoir. In some embodiments, this adjustment of the pump may be done manually, or it may be done automatically, either continually or periodically. In some embodiments, the pump comprises a diaphragm pump, peristaltic pump, and/or a volumetric pump (e.g., a piston pump, a centrifugal pump, and/or gear pump). In some embodiments, the pump can be adjusted using a controller. For example, the controller may receive a signal from the sensor of the reservoir unit and subsequently send a signal that results in the adjustment of the speed of the pump.

In some embodiments, the system further comprises a third fluidic separator. For example, in FIG. 1B, system 100B comprises third fluidic separator 165. In some cases, as shown in FIG. 1B, third fluidic separator 165 is fluidically connected to second reservoir 166 and second pump 167. Without wishing to be bound by theory, it is believed that the systems disclosed herein can, in certain cases, facilitate more effective separations, purifications, isolations, and/or recoveries due, in part, to the ability to combine multiple fluidic separators.

For example, for tougher separations, even more fluidic separators may be added. As a non-limiting example, in FIG. 1C, system 100C comprises fourth fluidic separator 170. In certain cases, as shown in FIG. 1C, fourth fluidic separator 170 is fluidically connected to third reservoir 171 and third pump 172. In some instances, the system comprises greater than or equal to three fluidic separators, greater than or equal to four fluidic separators, or greater than or equal to five fluidic separators. In certain instances, the system comprises less than or equal to ten fluidic separators, less than or equal to six fluidic separators, less than or equal to five fluidic separators, less than or equal to four fluidic separators, or less than or equal to three fluidic separators. Combinations of these ranges are also possible. In certain cases, the second outlet of the second fluidic separator is fluidically connected to a third fluidic separator. For example, in FIG. 1C, second outlet 146 of second fluidic separator 110 is fluidically connected to third fluidic separator 165.

In certain instances, the method comprises transporting a fluidic combination into an inlet of the first fluidic separator. The fluidic combination may include two or more components that one desires to separate. As noted above, examples of fluidic combinations include, but are not limited to, a suspension of two or more components, an emulsion of two or more components, mixed solvents, slugs of one liquid in another, and/or bubbles of a gas in a liquid.

The fluidic combination can comprise, for example, a first fluid and a second fluid. The first and second fluids can form separate phases, in some embodiments. In some embodiments, the first fluid is a first liquid and the second fluid is a second liquid that is immiscible in the first liquid.

In some cases, the fluidic combination comprises at least a portion of the fluid from the first outlet of the second fluidic separator. (Solely for purposes of convenience, in such embodiments, fluid that is transported from an outlet of the second fluidic separator into an inlet of the first fluidic separator is also referred to herein as "recycle fluid." For example, in some cases, the fluidic combination comprises at least a portion of the recycle fluid.) The fluidic combination can also comprise another portion of fluid such as, for example, a feed fluid comprising a solute (e.g., a contaminant). Referring to FIG. 1A, for example, fluidic combination 142 is transported into inlet 155 of first fluidic separator 105. In FIG. 1A, fluidic combination 142 comprises at least a portion of the fluid (e.g., recycle fluid) from first outlet 145 of second fluidic separator 110, which has traveled through fluidic pathway 180. Fluidic combination 142 also comprises another feed fluid 141 (which can be, for example, a fluid comprising a solvent and a solute (e.g., a contaminant)).

In some instances, the recycle fluid that is part of the fluidic combination fed to the first separator comprises an aqueous solvent. In certain cases, the recycle fluid that is part of the fluidic combination fed to the first separator comprises an organic solvent. In some examples, the recycle fluid that is part of the fluidic combination fed to the first separator comprises a combination of an organic solvent and an aqueous solvent (e.g., water mixed with an organic solvent). In still other examples, the recycle fluid that is part of the fluidic combination fed to the first separator comprises a gas.

According to certain embodiments, the fluidic combination comprises a feed fluid comprising a solvent and a first concentration of a solute. This feed fluid can originate from, for example, a feed fluid stream. Referring to FIG. 1A, for example, feed fluid 141 can comprise a solution comprising a solvent and a solute. Feed fluid 141 can be part of fluidic combination 142 such that the fluidic combination also comprises the solvent and solute from the feed fluid. In some embodiments, the fluidic system can be used to produce a product stream comprising the solvent from the feed fluid (e.g., 141 in FIG. 1A) and an amount of the solute that is lower than the amount of the solute present in the feed fluid. As one non-limiting example, the feed fluid may contain a solvent and a contaminant, and the fluidic system may be configured to produce a product stream in which the concentration of the contaminant within that solvent is lower than the concentration of the contaminant within the feed stream.

Examples of solutes that can be present in the feed stream and/or the fluidic combination include synthetic products, pharmaceutical products, chemical compounds, metals, catalysts, and/or radioactive materials.

The feed stream (and/or the portion of the fluidic combination originating from the feed stream) can also comprise any of a variety of solvents. In some cases, the solvent in the feed stream (and/or the portion of the fluidic combination originating from the feed stream) comprises an organic solvent. Non-limiting examples of organic solvents include alcohols, toluene, hexane, dichloromethane (DCM), dimethyl sulfoxide (DMSO) tetrahydrofuran (THF), 2-methyl-tetrahydrofuran, N,N-dimethylformamide (DMF), perfluorinated organics, and/or ethyl acetate. In certain instances, the solvent in the feed stream (and/or the portion of the fluidic combination originating from the feed stream) comprises an aqueous solvent. Non-limiting examples of aqueous solvents include water, acidic solutions, and/or basic solutions. In some examples, the solvent in the feed stream (and/or the portion of the fluidic combination originating from the feed stream) comprises a combination of an organic solvent and an aqueous solvent (e.g., water mixed with an organic solvent).

In some embodiments, at least one of the solvents within the feed stream is different from at least one of the solvents within the recycle fluid. For example, referring back to FIG. 1A, in some embodiments, at least one of the solvents within the fluid from first outlet 145 of second fluidic separator 110 is different from at least one of the solvents within feed fluid 141. In some embodiments, the recycle fluid comprises an organic solvent (optionally with another solvent such as an aqueous solvent), and the feed stream comprises an aqueous solvent. In certain embodiments, the recycle fluid comprises an aqueous solvent (optionally with another solvent such as an organic solvent), and the feed stream comprises an organic solvent.

In some embodiments, the feed stream can include a relatively high concentration of a first solvent, and a relatively high concentration of a second solvent can be transported into the system at another location. (For purposes of convenience only, the source of the relatively highly concentrated second solvent is also referred to herein as the "secondary input stream".) For example, referring to FIG. 1A, in some embodiments, feed fluid 141 can comprise a relatively high concentration of a first solvent, and optional secondary input stream 147 can comprise a relatively high concentration of a second solvent. As a non-limiting example, feed fluid 141 can contain, for example, a relatively high amount of aqueous solvent while optional secondary input stream contains a relatively high amount of organic solvent. As another non-limiting example, feed fluid 141 can contain, for example, a relatively high amount of organic solvent while optional secondary input stream contains a relatively high amount of aqueous solvent. In some embodiments, the optional secondary input stream can transport solvent into the first fluidic pathway between the first separator and the second separator. Referring to FIG. 1A, for example, optional secondary input stream transports solvent into fluidic pathway 125.

In some embodiments, the recycle fluid contains a solvent that acts as a transfer solvent. As used herein, a "transfer solvent" refers to a solvent that more readily solubilizes at least one solute within the feed stream, relative to the solubility of the solute in the feed stream, such that solute within the feed stream is transferred from the feed stream to the transfer solvent. In certain embodiments, mixing the feed stream and the recycle fluid (e.g., at point 144 in FIG. 1A) causes at least a portion (e.g., at least 10 wt %, at least 25 wt %, at least 50 wt %, at least 75 wt %, at least 90 wt %, at least 99 wt %, or all) of at least one solute within the feed stream to be transferred to a transfer solvent within the recycle fluid.

The first fluidic separator can be used, according to some embodiments, to produce a first outlet stream enriched in a first component (e.g., first liquid) of the fluidic combination (relative to the amount of the first component in the fluidic combination), and a second product stream that is enriched in a second component (e.g., a second liquid) of the fluidic combination (relative to the amount of the second liquid in the fluid combination). For example, referring to FIG. 1, in some embodiments, operation of first fluidic separator 105 forms solution 151 (exiting first outlet 157) which can be enriched in a liquid from third segment 140 (e.g., a transfer solvent, optionally with one or more additional solvents), relative to fluidic combination 142. In addition, in some embodiments, operation of first fluidic separator 105 forms stream 149 (exiting second outlet 150) that is enriched in a liquid from feed fluid 141 (e.g., a feed solvent), relative to fluidic combination 142.

In some embodiments, one or more of the enriched streams from the first fluidic separator can be transported to the second fluidic separator. In FIG. 1A, for example, stream 149 can be transported from second outlet 150 of first fluidic separator 105 to inlet 160 of second fluidic separator 110. In certain embodiments, the enriched stream can be mixed with an optional secondary input stream before being fed to the second fluidic separator. For example, in FIG. 1A, stream 149 is mixed with optional secondary input stream 147 to form stream 152, before being transported to second fluidic separator 110. The optional secondary input stream can be used, for example, to introduce a second solvent (e.g., a transfer solvent), which can remove further amounts of one or more solutes from a solvent within stream 149.

The second fluidic separator can be used, according to some embodiments, to produce a first outlet stream enriched in a first component (e.g., first liquid) of the stream fed to the second fluidic separator (relative to the amount of the first component in the stream fed to the second fluidic separator), and a second product stream that is enriched in a second component (e.g., a second liquid) of the stream fed to the second fluidic separator (relative to the amount of the second liquid in the stream fed to the second fluidic separator). For example, referring to FIG. 1, in some embodiments, operation of second fluidic separator 110 can form a stream transported through first segment 130 (exiting first outlet 145) which can be enriched in a liquid from optional secondary input stream 147 (e.g., a transfer solvent, optionally with one or more additional solvents), relative to stream 152. In addition, in some embodiments, operation of second fluidic separator 110 can form second solution 148 (exiting second outlet 146) that is enriched in a liquid from stream 149 (e.g., a feed solvent from feed fluid 141), relative to stream 152.

The transfer of solute from the feed stream to a transfer solvent can result, in some embodiments, in the production of a product stream comprising a solvent from the feed stream and having a relatively low concentration of that solute (relative to the concentration of that solute in the feed stream). In some embodiments, the method comprises collecting (e.g., from the second fluidic separator) a fluid comprising solvent from the feed stream, wherein, for at least one solute present in the feed stream, the concentration of that solute in the collected stream is lower than the concentration of that solute in the feed stream. (For the purposes of making such a comparison, it should be understood that the concentration of the solute in the collected stream can be zero or non-zero, and if a solute that is present in the feed stream is completely absent from the collected stream, the collected stream would still be said to have a concentration of that solute that is lower than the concentration of that solute in the feed stream.) As one non-limiting example, in FIG. 1A, a second solution 148 can be collected from second outlet 146 of second fluidic separator 110, wherein the second solution comprises a solvent from feed fluid 141, and second solution 148 has a concentration of at least one solute that is present within feed fluid 141 that is lower than the concentration of that solute in the feed stream. Such operation can be useful, for example, in purifying the solvent, for example, by transferring a contaminant from one solvent to another liquid to enable reuse of the solvent. Such operation could also be useful, for example, in separating different solutes from each other. For example, such operation could be used to purify a second solute that remains in the solvent (e.g., by transferring at least a portion of an unwanted solute out of the solvent leaving behind a purified amount of a desired solute; or by transferring at least a portion of a desired solute out of the solvent to produce a purified stream of the desired solute and leaving undesired solute behind). In some embodiments, the reduction in the concentration of the solute in the second solution (e.g., 148 in FIG. 1A) compared to the feed fluid (e.g., 141 in FIG. 1A) is facilitated by the transfer solvent being more selective for the solute than a solvent in the feed fluid (e.g., such that mixing the fluids at point 144 facilitates transfer of the solute from a solvent in the feed fluid to a transfer solvent in the recycle fluid).

In certain embodiments, transfer of a solute from the feed stream to a transfer solvent can lead to the production of a product stream comprising the transfer solvent and a relatively high concentration of that solute (relative to the concentration of that solute in the recycle stream and/or in the optional secondary input stream). In some embodiments, the method comprises collecting (e.g., from the first fluidic separator) a fluid comprising transfer solvent from the recycle fluid, wherein, for at least one solute present in the feed stream, the concentration of that solute in the collected stream is higher than the concentration of that solute in the feed stream. As one non-limiting example, in FIG. 1A, solution 151 can be collected from first outlet 157 of first fluidic separator 105, wherein solution 151 comprises transfer solvent from third segment 140 (e.g., recycle stream), and solution 151 has a concentration of at least one solute that is present within feed fluid 141 that is higher than the concentration of that solute in feed fluid 141.

In some embodiments, the method comprises transporting a second fluid from the second fluidic separator to a third fluidic separator. For example, in FIG. 1B, a second fluid is transported from second fluidic separator 110 to third fluidic separator 165. This can be useful, for example, if the use of two fluidic separators is insufficient to obtain the desired level of separation. In certain instances, fluid from the second outlet of second fluidic separator 110 will be transported to third fluidic separator 165, where it will be further separated into two outlets. In some cases, one of the outlets of the third fluidic separator may lead downstream (e.g., to a fourth fluidic separator or to a unit for collection), while the other outlet may be fluidically connected upstream to the second fluidic separator. In certain embodiment, as shown in FIG. 1B, third fluidic separator 165 is fluidically connected to second reservoir 166, second pump 167, and second fluidic separator 110.

In certain embodiments, the method comprises transporting fluid from the third fluidic separator to a fourth fluidic separator. For example, in FIG. 1C, a fluid is transported from third fluidic separator 165 to fourth fluidic separator 170. This can be useful, for example, if use of three fluidic separators is insufficient to obtain the desired level of separation. In certain instances, fluid from an outlet of third fluidic separator 165 will be transported to fourth fluidic separator 170, where it will be further separated into two outlets. In some cases, one of the outlets of the fourth fluidic separator may lead downstream (e.g., to a fifth fluidic separator or to a unit for collection), while the other outlet may be fluidically connected upstream to the third fluidic separator. In certain embodiments, as shown in FIG. 1C, fourth fluidic separator 170 is fluidically connected to third reservoir 171, third pump 172, and third fluidic separator 165.

Any of a variety of types of fluidic separators may be used in conjunction with the embodiments described herein. In some embodiments, all of the fluidic separators may be of the same type (or may be essentially identical). In other embodiments, one or more of the separators in the system may be different from one or more other separators in the system. For example, in certain cases, the fluidic separators comprise centrifugal separators.

As one example, a fluidic separator comprising a porous medium may be used (e.g., as the first and/or second fluidic separator), in certain embodiments. In some cases, the fluidic separator achieves separation through the use of interfacial tension within the pores of the porous medium. In some such cases, the pressure and/or volumetric flow rate of the incoming mixture must be sufficiently high to facilitate selective transport of the desired fluid through the pores of the porous medium while restricting transportation of the undesired fluid through the porous medium. Examples of such fluidic separators are described, for example, in International Patent Publication No. WO 2004/087283, published on Oct. 14, 2004, filed as International Patent Application No. PCT/US2004/009451 on Mar. 25, 2004, and entitled "Fluid Separation"; International Patent Publication No. WO 2007/006033, published on Jan. 11, 20017, filed as International Patent Application No. PCT/US2006/026464 on Jul. 5, 2006, and entitled "Microfluidic Separators for Multiphase Fluid-Flow Based on Membranes"; and International Patent Publication No. WO 2014/026098, published on Feb. 13, 2014, filed as International Patent Application No. PCT/US2013/054312 on Aug. 9, 2013, and entitled "Pressure Control in Fluidic Systems"; each of which is incorporated herein by reference in its entirety for all purposes.

Figure 4A:
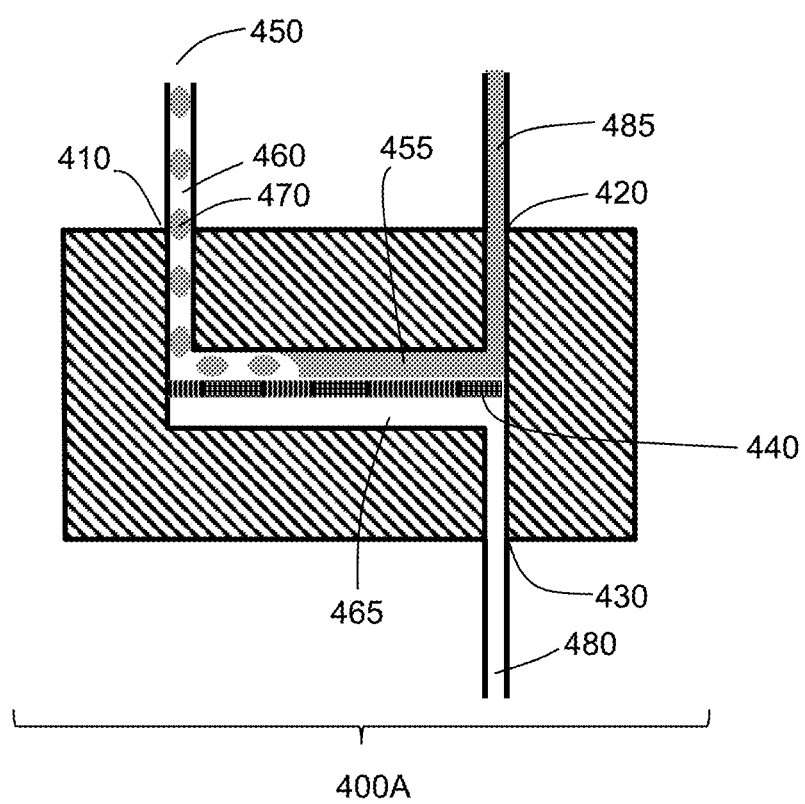
FIG. 4A is, in accordance with certain embodiments, a cross-sectional schematic illustration of a fluidic separator.

In certain embodiments, one or more of the fluidic separators comprises a porous medium-based fluidic separator. In certain instances, the porous medium separates the first outlet and the second outlet of one or more of the fluidic separators. One such exemplary separator (the type of which could be used as any of the fluidic separators described herein) is shown schematically in FIG. 4A. In FIG. 4A, fluidic separator 400A comprises porous medium 440 separating first outlet 420 of fluidic separator 400A and second outlet 430 of fluidic separator 400A. Non-limiting examples of porous media include porous membranes and porous discs (e.g., etched discs). In some embodiments, the porous medium of the separator comprises or is a porous membrane.

The solid portion of the porous medium can be made of any of a variety of materials including, but not limited to, metals, semiconductors, ceramics, polymers, and combinations thereof. In some embodiments, the solid portion of the porous medium comprises polyvinylidene fluoride (PVDF), polytetrafluoroethylene (PTFE), cellulose acetate, polypropylene, polyethylene, polysulfane, polyether sulfone, and/or polyvinyl chloride.

According to certain embodiments, the fluidic combination transported into the separator comprising the porous medium comprises a first fluid and a second fluid. For example, in FIG. 4A, fluidic combination 450, transported into inlet 410 of fluidic separator 400A, comprises first fluid 460 and fluid 470.

The first and second fluids can form separate phases, in some embodiments. An example of such is shown in FIG. 4A, in which fluid 470 is shown as an immiscible slug within first fluid 460. In some embodiments, the first fluid is a first liquid and the second fluid is a second liquid that is immiscible in the first liquid. In certain cases, the fluidic combination comprises an emulsion.

In some embodiments, the first fluid of the fluidic combination comprises a solution comprising a first solvent and a solute, and the second fluid of the fluidic combination comprises a second solvent. Referring to FIG. 4A, in some embodiments, first fluid 460 can comprise a solution comprising a first solvent and a solute, and fluid 470 can comprise a second solvent. In certain embodiments, fluid 470 can comprise a solution comprising a first solvent and a solute, and first fluid 460 can comprise a second solvent.

As noted above, in certain embodiments, the porous medium is pre-wetted with one liquid from the fluidic combination. In some such embodiments, the liquid type that has been used to pre-wet the porous medium is selectively passed through the pre-wetted porous medium. As would be understood by those of ordinary skill in the art, "selective" transport of a first component through a porous medium (the "selectively transported component") relative to another component (the "selectively retained component") means that a higher percentage of the selectively transported component is transported through the porous medium, resulting in the formation of a fluid on the permeate side of the porous medium that is enriched in the selectively transported component (relative to the fluidic combination being transported into the separator) and a fluid on the retentate side of the porous medium that is enriched in the selectively retained component (again, relative to the fluidic combination being transported into the separator). For example, in FIG. 4A, porous medium 440 has been pre-wetted with the solvent of first fluid 460, such that that solvent of the first fluid (and possibly, in some embodiments, some or all solutes dissolved therein) is selectively transported through the porous medium (e.g., with application of a hydraulic pressure to the retentate side of the porous medium) while fluid 470 is selectively retained by the porous medium. The selective transport of first fluid 460 through porous medium 440 results in the formation of fluid 455 on the retentate side of porous medium 440 that is enriched in fluid 470 (the selectively retained component) relative to fluidic combination 450, and the formation of fluid 465 on the permeate side of porous medium 440 that is enriched in first fluid 460 (the selectively transported component) relative to fluidic combination 450.

In some instances, the pores within the porous medium within a separator are sized such that, when the porous medium is pre-wetted with one of the fluids within the incoming mixture, and the pressure of the incoming stream is sufficiently high, the pre-wetted fluid type is selectively transported through the porous medium while the other fluid(s) within the incoming mixture are selectively retained by the porous medium. Specific pore properties may be selected, in certain cases, to enhance the selectivity of the porous medium for a particular fluid.

In some embodiments in which the separator comprises a porous medium, it is important to control the amount of hydraulic pressure that is being applied to the retentate side of the porous medium (e.g., to ensure that the pressure is sufficiently high to allow for effective separation and/or to ensure that the pressure is not so high that the fluidic combination is transported through the retentate side without having a chance to be separated). A non-limiting example of a system in which the use of the pump and reservoir arrangements described herein can be especially beneficial is a system in which multiple porous-medium-based separators are employed in the system. Referring to FIG. 1A, for example, if both first fluidic separator 105 and second fluidic separator 110 comprise porous media (e.g., as illustrated in the exemplary separator shown in FIG. 4A), it can, in some instances, be important to ensure that the hydraulic pressures on the retentate sides of those separators is carefully controlled. If, for example, the pressure on the retentate side of a porous medium within first fluidic separator 105 is insufficiently high to achieve effective separation, one might increase the speed of pump 120 to increase the amount of fluid transported through third segment 140 (thus increasing the hydraulic pressure applied to the retentate side within first fluidic separator 105). However, increasing the speed of pump 120 in the absence of reservoir 115 could lead to a decrease in pressure on the retentate side of second fluidic separator 110, which could then lead to ineffective separation within second fluidic separator 110. The presence of reservoir 115 can provide a buffer that makes it easier to adjust the hydraulic pressure on the retentate side of first fluidic separator 105 while reducing unwanted perturbations in the hydraulic pressure on retentate side of second fluidic separator 110.

Figure 4B:
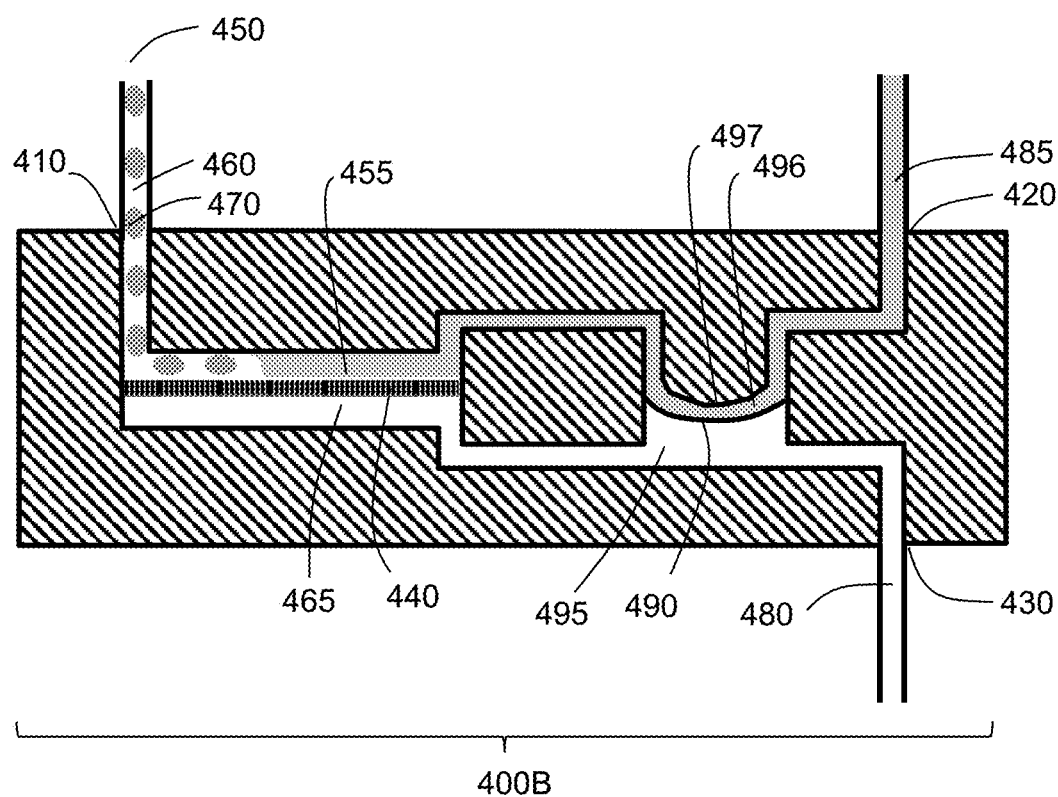
FIG. 4B is, in accordance with certain embodiments, a cross-sectional schematic illustration of a fluidic separator.

As another example of a system in which the use of the pump and reservoir arrangements described herein can be especially beneficial is a system in which the porous-medium-based separators comprise a moveable surface (e.g., a diaphragm) separating the first outlet and the second outlet. In some embodiments, this additional moveable surface is impermeable. In certain embodiments, this additional moveable surface is flexible. For example, in FIG. 4B, fluidic separator 400B comprises diaphragm 490, which is impermeable, such that fluid 465 and fluid 455 cannot pass from one side of diaphragm 490, through diaphragm 490, and to the other side of diaphragm 490. Examples of porous-medium-based separators comprising an additional moveable surface (an in which the moveable surface is used as a pressure controller) are described in International Patent Publication No. WO 2014/026098, published on Feb. 13, 2014, filed as International Patent Application No. PCT/US2013/054312 on Aug. 9, 2013, and entitled "Pressure Control in Fluidic Systems", which is hereby incorporated by reference.

As discussed above, in porous medium-based separators, it can be important, in some cases, to control the amount of hydraulic pressure that is being applied to the retentate side of the porous medium (e.g., to ensure that the pressure is sufficiently high to allow for effective separation and/or to ensure that the pressure is not so high that the fluidic combination is transported through the retentate side without having a chance to be separated). Referring back to FIG. 4B, diaphragm 490, in some instances, is in contact with wall 497, such that fluidic channel 496 is closed, unless there is sufficient pressure applied to the inlet of the fluidic separator. When sufficient pressure is applied to the inlet, in certain instances, the pressure pushes diaphragm 490 away from wall 497, such that fluidic channel 496 is open and fluid 455 can flow through it, and fluidic channel 495 is open such that fluid 465 can flow through it. According to some embodiments, diaphragm 490 prevents or reduces the occurrence of ineffective separations that could result from insufficient pressure.

Referring to FIG. 1A, for example, if both first fluidic separator 105 and second fluidic separator 110 comprise an additional moveable surface (e.g., as illustrated in the exemplary separator shown in FIG. 4B), it can, in some instances, be important to ensure that the hydraulic pressures on, for example inlet 155 and first outlet 145 of second fluidic separator 110 are carefully controlled. If, for example, the pressure on inlet 155 is insufficiently high to achieve effective separation, one might increase the speed of pump 120 to increase the amount of fluid transported through third segment 140 (thus increasing the hydraulic pressure applied to inlet 155 of first fluidic separator 105). However, increasing the speed of pump 120 in the absence of reservoir 115 could lead to a decrease in pressure in first outlet 145 of second fluidic separator 110, which could then lead to stoppage of separation within second fluidic separator 110 because, for example, the vacuum formed by the decrease in pressure could cause diaphragm 490 (of FIG. 4B) to contact wall 497, such that fluidic channel 496 is closed and fluid 455 no longer flows. The presence of reservoir 115 can provide a buffer that makes it easier to adjust the hydraulic pressure on inlet 155 of first fluidic separator 105 while reducing unwanted perturbations in the hydraulic pressure on first outlet 145 of second fluidic separator 110. In some embodiments, the method comprises collecting a first product stream that is enriched in a first fluid within the fluid mixture that was transported into the separator comprising the porous medium, and collecting a second product stream that is enriched in a second fluid within the fluid mixture that was transported into the separator. For example, referring to FIG. 4A, certain embodiments comprise collecting product stream 480, which is enriched in first fluid 460 relative to fluidic combination 450. In addition, certain embodiments comprise collecting product stream 485, which is enriched in fluid 470 relative to fluidic combination 450.

In some embodiments, relatively complete separations of the first and second fluids can be achieved. For example, in some embodiments, at least 50 wt %, at least 75 wt %, at least 85 wt %, at least 90 wt %, at least 95 wt %, at least 99 wt %, at least 99.9 wt %, or at least 99.99 wt % of the first fluid that is present in the fluidic combination fed to the separator can be removed from the product stream that is enriched in the second fluid. For example, referring to FIGS. 4A-4B, in some embodiments, at least 50 wt % (or at least 75 wt %, at least 85 wt %, at least 90 wt %, at least 95 wt %, at least 99 wt %, at least 99.9 wt %, or at least 99.99 wt %) of first fluid 460 in fluidic combination 450 fed to the separator has been removed from product stream 485. In certain embodiments, at least 50 wt %, at least 75 wt %, at least 85 wt %, at least 90 wt %, at least 95 wt %, at least 99 wt %, at least 99.9 wt %, or at least 99.99 wt % of the second fluid that is present in the fluidic combination fed to the separator can be removed from the product stream that is enriched in the first fluid. For example, referring to FIGS. 4A-4B, in some embodiments, at least 50 wt % (or at least 75 wt %, at least 85 wt %, at least 90 wt %, at least 95 wt %, at least 99 wt %, at least 99.9 wt %, or at least 99.99 wt %) of fluid 470 in fluidic combination 450 fed to the separator has been removed from product stream 480.

In accordance with some embodiments, the fluidic system is configured to separate an input at a volumetric flow rate greater than or equal to 0.01 mL/min, greater than or equal to 1 mL/min, greater than or equal to 10 mL/min, greater than or equal to 100 mL/min, greater than or equal to 1 L/min, greater than or equal to 10 L/min, or greater than or equal to 100 L/min. For example, in some embodiments, system 100 in FIG. 1A is configured to separate an input fed to first fluidic separator 105 at a volumetric flow rate greater than or equal to 0.01 mL/min, greater than or equal to 1 mL/min, greater than or equal to 10 mL/min, greater than or equal to 100 mL/min, greater than or equal to 1 L/min, greater than or equal to 10 L/min, or greater than or equal to 100 L/min. In certain embodiments, the fluidic system is configured to separate an input at a volumetric flow rate less than or equal to 1000 L/min, less than or equal to 500 L/min, less than or equal to 100 L/min, less than or equal to 10 L/min, less than or equal to 3 L/min, less than or equal to 1 L/min, less than or equal to 500 mL/min, or less than or equal to 100 mL/min. For example, in some embodiments, system 100 in FIG. 1A is configured to separate an input fed to first fluidic separator 105 at a volumetric flow rate less than or equal to 1000 L/min, less than or equal to 500 L/min, less than or equal to 100 L/min, less than or equal to 10 L/min, less than or equal to 3 L/min, less than or equal to 1 L/min, less than or equal to 500 mL/min, or less than or equal to 100 mL/min. Combinations of these ranges are also possible. For example, in some instances, the fluidic system is configured to separate an input at a volumetric flow rate between 0.01 mL/min and 1000 L/min (inclusive) or at a volumetric flow rate between 1 mL/min and 3 L/min (inclusive). In some embodiments, the rates of separation described in this paragraph can be achieved while also achieving the degrees of separation mentioned above (e.g., in the immediately preceding paragraph).

A variety of applications can, in certain cases, incorporate certain of the systems and methods described herein. In some embodiments, the system is or is part of a chemical synthesis system. In some embodiments, the system is or is part of a system for the separation of multiphasic mixtures (e.g., biphasic mixtures). In some embodiments, the system is or is part of a liquid-liquid extraction (e.g., separation of alcohols from organic solvents) system. In some embodiments, the system is or is part of a liquid-gas extraction system.

Certain of the embodiments described herein can provide one or more benefits. Certain of the fluidic systems described herein are capable of achieving more effective separation, more effective purification, more effective isolation, more effective recovery, usage of lower volumes of solvents/fluids, improved regulation of pressure and/or volumetric flow rates, ease of use, ease of maintaining cleanliness, ease of adding or removing fluidic separators, usage with low volumes, ease of scale-up, and/or ease of use on a benchtop.

Various of the components described herein can be "directly fluidically connected" to other components (e.g., as described, in certain cases, above). Generally, a direct fluid connection exists between a first component and a second component (and the two components are said to be "directly fluidically connected" to each other) when they are fluidically connected to each other and, during operation of the system, there is no bleed from, or supplemental feed to, the stream that connects the first component and second component. To illustrate, in FIG. 1A, reservoir 115 is directly fluidically connected to fluidic separator 110 via segment 130 because there is not bleed from or supplemental feed to segment 130 during operation. In contrast, segment 140, as shown in FIG. 1A, is not directly fluidically connecting pump 120 to fluidic separator 105 because feed 141 is supplementing segment 140 at point 144 before the combination is transported into fluidic separator 105.

In some embodiments, two components that are directly fluidically connected to each other are also fluidically connected to each other such that during operation of the system, the composition of the fluid does not substantially change (i.e., no fluid component changes in relative abundance by more than 5 wt % and no phase change occurs) as it is transported from the first component to the second component. As an illustrative example of one such embodiment, a stream could connect first and second components, and the pressure and temperature of the fluid could be adjusted, but the composition of the fluid does not substantially change during operation of the system.

The control schemes described herein (e.g., using a controller to control pump speed based, at least in part, upon a signal received by the controller from a sensor associated with the reservoir unit) can be implemented in any of a number of ways. In some embodiments, the controller comprises one or more processors. The processor may be part of, according to certain embodiments, a computer implemented control system. The computer implemented control system can be used to operate various components of the fluidic system. In general, any calculation methods, steps, simulations, algorithms, systems, and system elements described herein may be implemented and/or controlled using one or more computer implemented control system(s).

The computer implemented control system can be part of or coupled in operative association with one or more reservoir units, pumps, and/or other system components that might be automated, and, in some embodiments, is configured and/or programmed to control and adjust operational parameters, as well as analyze and calculate values, for example any of the reservoir conditions and/or pump speeds described above. In some embodiments, the computer implemented control system(s) can send and receive reference signals to set and/or control operating parameters (e.g., pump speeds) of system apparatus. In other embodiments, the computer implemented system(s) can be separate from and/or remotely located with respect to the other system components and may be configured to receive data from one or more systems of the embodiments via indirect and/or portable means, such as via portable electronic data storage devices, such as magnetic disks, or via communication over a computer network, such as the Internet or a local intranet.

The computer implemented control system(s) may include several known components and circuitry, including a processor, a memory system, input and output devices and interfaces (e.g., an interconnection mechanism), as well as other components, such as transport circuitry (e.g., one or more busses), a video and audio data input/output (I/O) subsystem, special-purpose hardware, as well as other components and circuitry, as described below in more detail. Further, the computer system(s) may be a multi-processor computer system or may include multiple computers connected over a computer network.

The computer implemented control system(s) may include a processor, for example, a commercially available processor such as one of the series x86; Celeron, Pentium, and Core processors, available from Intel; similar devices from AMD and Cyrix; similar devices from Apple Computer; the 680X0 series microprocessors available from Motorola; and the PowerPC microprocessor from IBM. Many other processors are available, and the computer system is not limited to a particular processor.

A processor typically executes a program called an operating system (of which Windows, UNIX, Linux, DOS, VMS, an MacOS) are examples, which controls the execution of other computer programs and provides scheduling, debugging, input/output control, accounting, compilation, storage assignment, data management and memory management, communication control and related services. The processor and operating system can together define a computer platform for which application programs in high-level programming languages are written. The computer implemented control system is not limited to a particular computer platform.

The computer implemented control system(s) may include a memory system, which typically includes a computer readable and writeable non-volatile recording medium, of which a magnetic disk, optical disk, a flash memory, and tape are examples. Such a recording medium stores signals, typically in binary form (i.e., a form interpreted as a sequence of ones and zeros). Such signals may define a software program, e.g., an application program, to be executed by the microprocessor, or information to be processed by the application program.

The memory system of the computer implemented control system(s) also may include an integrated circuit memory element, which typically is a volatile, random access memory such as a dynamic random access memory (DRAM) or static memory (SRAM). Typically, in operation, the processor causes programs and data to be read from the non-volatile recording medium into the integrated circuit memory element, which typically allows for faster access to the program instructions and data by the processor than does the non-volatile recording medium.

The processor can manipulate the data within the integrated circuit memory element in accordance with the program instructions and then copies the manipulated data to the non-volatile recording medium after processing is completed. A variety of mechanisms are known for managing data movement between the non-volatile recording medium and the integrated circuit memory element, and the computer implemented control system(s) that implements the methods, steps, systems control and system elements control described above is not limited thereto. The computer implemented control system(s) is not limited to a particular memory system.

At least part of such a memory system described above may be used to store one or more data structures (e.g., look-up tables) or equations such as calibration curve equations. For example, at least part of the non-volatile recording medium may store at least part of a database that includes one or more of such data structures. Such a database may be any of a variety of types of databases, for example, a file system including one or more flat-file data structures where data is organized into data units separated by delimiters, a relational database where data is organized into data units stored in tables, an object-oriented database where data is organized into data units stored as objects, another type of database, or any combination thereof.

The computer implemented control system(s) and components thereof may be programmable using any of a variety of one or more suitable computer programming languages. Such languages may include procedural programming languages, for example, LabView, C, Pascal, Fortran and BASIC, object-oriented languages, for example, C++, Java and Eiffel and other languages, such as a scripting language or even assembly language.

The following example is intended to illustrate certain embodiments of the present invention, but does not exemplify the full scope of the invention.

EXAMPLE

This example describes the use of reservoirs to improve stability and operation of multi-stage liquid-liquid separators.

Figure 5:
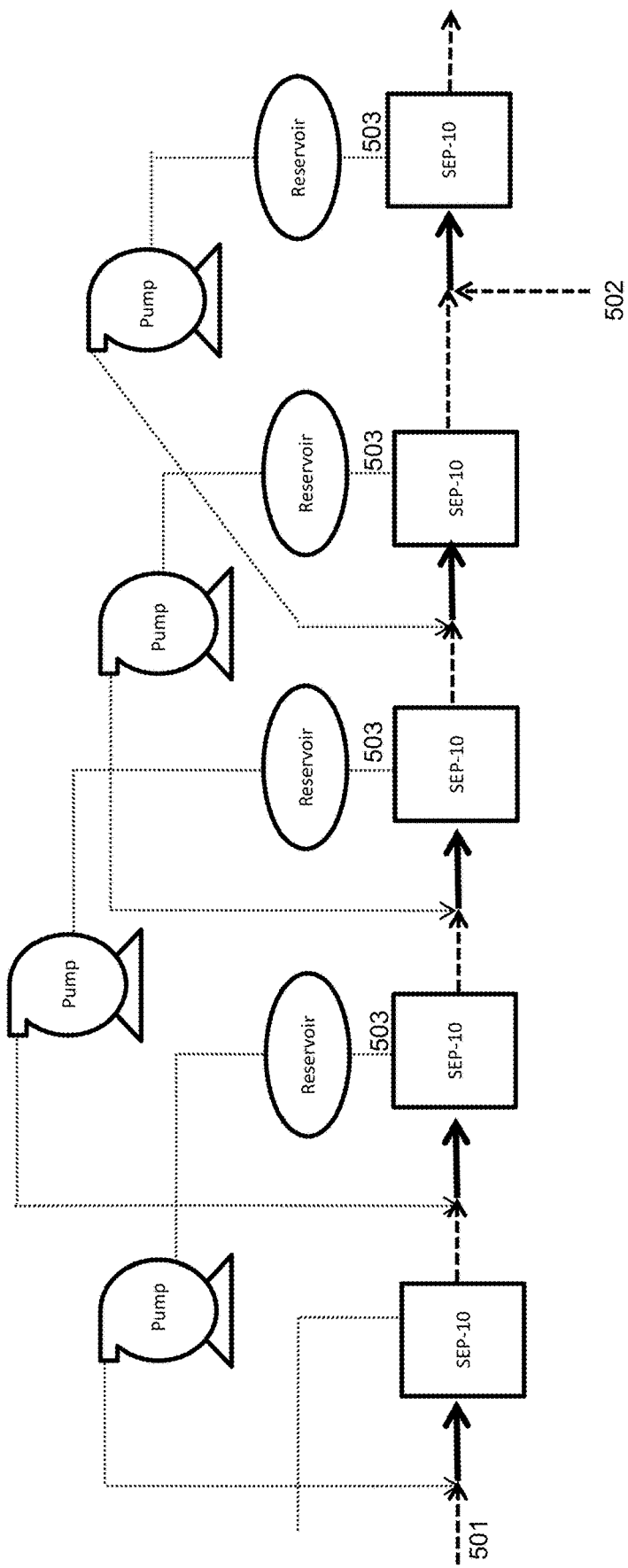
FIG. 5 is, in accordance with certain embodiments, a schematic illustration of a portion of a system comprising five fluidic separators.

Multi-day continuous operation of a countercurrent extraction system was performed using a system that comprised five Zaiput SEP-10 membrane separators. FIG. 5 is a schematic illustration showing how the system was operated. The SEP-10 membrane separators were operated in a manner consistent with the description of FIG. 4B above. External feeds of aqueous liquid (stream 501) and organic liquid (stream 502) were pumped into the system, one with Tacmina pump model QL30, and the other with pump Vici Valco M50. At the aqueous outlets of the four downstream separators (each outlet labeled 503 in FIG. 5) inline reservoirs were connected, followed by pumps (KNF diaphragm pump models NF 1.5 DCB-4). The pumps were used to pump the fluid to an upstream separator.

Figure 3D:
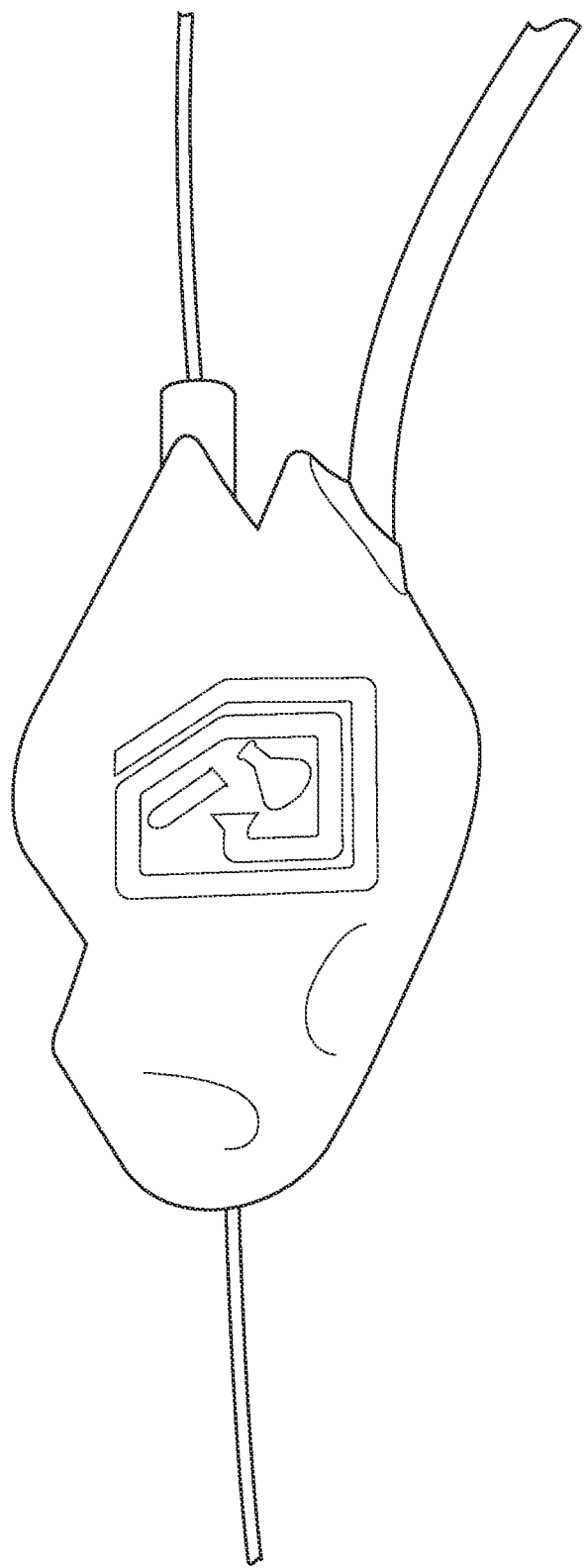
FIG. 3D is, in accordance with certain embodiments, a schematic of the top of a reservoir unit, wherein a top layer is not transparent, such that the contents of the reservoir are not visible.

Flexible bags were used as the in-line reservoirs. Each bag included a single inlet and a single outlet. The flexible bags were made by bonding plastic films to each other and to the inlet and outlet tubing. The plastic films were able to deform when liquid was pumped into the bag, allowing the bag to expand and contract. Each bag was enclosed in a plastic housing that also contained an LED and a phototransistor. (See, e.g., FIGS. 3B-3D.) When the bag expanded, it decreased the amount of light received by the phototransistor, and the associated electrical signal was used to control the speed of the pump through a microcontroller (Arduino Uno). If the bag was filled too much (causing the electrical signal to exceed a certain threshold) the pump flow rate was increased. If the bag was filled only very little or was empty (causing the electrical signal to drop below a certain threshold), then the pump flow rate was slowed or stopped.

Experiments were run using toluene as the organic phase and water (with dye, to increase flow visibility) as the aqueous phase. Additional experiments were performed using hexane as an organic phase and water (with dye, to increase flow visibility) as the aqueous phase. Still additional experiments were carried out using toluene as a first phase and a mixture of acetone and water as a second phase, to perform the extraction of acetone from the acetone/water mixture into the toluene. (This latter liquid-liquid system is often used in the literature to benchmark and evaluate multistage extraction technologies.)

The system shown in FIG. 5 exhibited greatly-enhanced stability and continuity of operation over a period of days, compared to similar systems that do not include the reservoir bags (which were only stable for a few minutes or hours). In particular, the system shown in FIG. 5 achieved highly efficient separation without damage to the separation membranes or diaphragms even during startup, shutdown, and non-steady-state operation.

The system shown in FIG. 5 provided important advantages relative to systems without the illustrated pump/reservoir arrangements. For example, systems without the pump/reservoir arrangements can be difficult to operate. Without wishing to be bound by any particular theory, it is believed that, in such systems, if the aqueous phase coming out of a separator needs to be recycled upstream, the flow rate and pressure condition at the outlet of a separator would need to be matched with the operating condition of the recycling pump when the reservoir is not present. Such operation is difficult, at least because if pump settings are not ideal, the pump will move either too much or too little fluid, compromising the quality of the separation. Again, without wishing to be bound by any particular theory, it is believed that if the pump is moving too much fluid (e.g., by running too quickly), a low pressure condition can result, which can interfere with proper pressure separation conditions (and, in cases in which a separator with a pressure controlling diaphragm is used, can interfere with the operation of the diaphragm of the controller forcing it to shut close). It is further believed that if the pump is moving too little fluid (e.g., by running too slowly) then a partial blockage of the fluidic pathway that determines overpressure can occur, thus interfering with separation conditions at the membrane. This disclosed example can provide a solution to the over constrained problem of needing to recycle a separated phase upstream of a membrane based separation unit. The system described in this example performed stably under particularly challenging conditions, such as during startup operation and during non-steady state operation (e.g., caused by change in operation parameters, such as a change of flow rates of the phases).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A fluidic system, comprising:
   a first fluidic separator;
   a second fluidic separator;
   a first fluidic pathway fluidically connected to an outlet of the first fluidic separator and an inlet of the second fluidic separator; and
   a second fluidic pathway fluidically connected to an inlet of the first fluidic separator and an outlet of the second fluidic separator, the second fluidic pathway comprising a first segment, a second segment, a pump, and a reservoir;
   wherein the reservoir is between the first segment and the second segment;
   wherein the pump is between the second segment and the inlet of the first fluidic separator, and the pump is between the reservoir and the inlet of the first fluidic separator; and
   wherein at least a portion of a wall of the reservoir is flexible.

2. The fluidic system of claim 1, wherein:
   the reservoir has a maximum cross-sectional dimension;
   the portion of the second fluidic pathway immediately upstream of the reservoir has a maximum cross-sectional dimension;
   the portion of the second fluidic pathway immediately downstream of the reservoir has a maximum cross-sectional dimension; and
   the maximum cross-sectional dimension of the reservoir is at least 3 times larger than the average of the maximum cross-sectional dimensions of the portions of the second fluidic pathway immediately upstream of the reservoir and immediately downstream of the reservoir.

3. The fluidic system of claim 1, wherein the reservoir is configured such that, during operation of the pump, a volumetric flow rate of fluid within the first segment of the second fluidic pathway is decoupled from a volumetric flow rate of fluid within the second segment of the second fluidic pathway.

4. The fluidic system of claim 1, wherein the reservoir is an enclosed reservoir.

5. A fluidic system, comprising:
   a first fluidic separator;
   a second fluidic separator;
   a first fluidic pathway fluidically connected to an outlet of the first fluidic separator and an inlet of the second fluidic separator; and
   a second fluidic pathway fluidically connected to an inlet of the first fluidic separator and an outlet of the second fluidic separator, the second fluidic pathway comprising a first segment, a second segment, a pump, and an enclosed reservoir;
wherein the enclosed reservoir is between the first segment and the second segment;
wherein the pump is between the second segment and the inlet of the first fluidic separator and the pump is between the enclosed reservoir and the inlet of the first fluidic separator; and
wherein the enclosed reservoir is configured such that, during operation of the pump, a volumetric flow rate of fluid within the first segment of the second fluidic pathway is decoupled from a volumetric flow rate of fluid within the second segment of the second fluidic pathway.

6. The fluidic system of claim 1, wherein at least a portion of the reservoir is removable from the fluidic system.

7. The fluidic system of claim 1, wherein at least a portion of the reservoir is disposable.

8. The fluidic system of claim 1, wherein the reservoir is flexible.

9. The fluidic system of claim 1, wherein the reservoir is a bag.

10. The fluidic system of claim 1, wherein at least a portion of the reservoir is transparent.

11. The fluidic system of claim 1, wherein the reservoir comprises plastic.

12. The fluidic system of claim 1, wherein the reservoir is associated with a sensor configured to detect an inflation status of the reservoir.

13. The fluidic system of claim 12, wherein the sensor comprises a light-sensitive component.

14. The fluidic system of claim 13, wherein the light-sensitive component comprises a photodiode and/or phototransistor.

15. The fluidic system of claim 12, wherein the reservoir is associated with a stimulus, and wherein the sensor interacts with the stimulus.

16. The fluidic system of claim 15, wherein the stimulus comprises a light source.

17. The fluidic system of claim 1, wherein the outlet of the first fluidic separator is a first outlet of the first fluidic separator, and the first fluidic separator further comprises a second outlet.

18. The fluidic system of claim 1, wherein the outlet of the second fluidic separator is a first outlet of the second fluidic separator, and the second fluidic separator further comprises a second outlet.

19. The fluidic system of claim 18, further comprising a third fluidic separator fluidically connected to the second outlet of the second fluidic separator.

20. The fluidic system of claim 17, further comprising a porous medium separating the first outlet of the first fluidic separator and the second outlet of the first fluidic separator.

21. The fluidic system of claim 18, further comprising a porous medium separating the first outlet of the second fluidic separator from the second outlet of the second fluidic separator.

22. The fluidic system of claim 18, wherein the first segment is directly fluidically connected to the first outlet of the second fluidic separator and to the reservoir.

23. The fluidic system of claim 1, wherein the second segment is directly fluidically connected to the reservoir and the pump.

24. The fluidic system of claim 1, wherein the second fluidic pathway further comprises a third segment.

25. The fluidic system of claim 24, wherein the third segment is directly fluidically connected to the pump and is connected to the inlet of the first fluidic separator.

26. The fluidic system of claim 1, wherein the fluidic system is configured to separate an input at a volumetric flow rate between 0.01 mL/min and 1000 L/min.

27. A fluidic system, comprising:
a first fluidic separator comprising an inlet and an outlet;
a second fluidic separator comprising an inlet and an outlet;
a first fluidic pathway fluidically connected to the outlet of the first fluidic separator and the inlet of the second fluidic separator; and
a second fluidic pathway fluidically connected to the inlet of the first fluidic separator and the outlet of the second fluidic separator;
wherein the second fluidic pathway comprises:
a reservoir comprising an inlet fluidically connected to the outlet of the second fluidic separator, and
a pump comprising:
an inlet fluidically connected to an outlet of the reservoir, and
an outlet fluidically connected to the inlet of the first fluidic separator, and
wherein at least a portion of a wall of the reservoir is flexible.

28. A fluidic system, comprising:
a first fluidic separator comprising an inlet and an outlet;
a second fluidic separator comprising an inlet and an outlet;
a first fluidic pathway fluidically connected to the outlet of the first fluidic separator and the inlet of the second fluidic separator; and
a second fluidic pathway fluidically connected to the inlet of the first fluidic separator and the outlet of the second fluidic separator;
wherein the second fluidic pathway comprises:
an enclosed reservoir comprising an inlet fluidically connected to the outlet of the second fluidic separator, and
a pump comprising:
an inlet fluidically connected to an outlet of the enclosed reservoir, and
an outlet fluidically connected to the inlet of the first fluidic separator, and
wherein the enclosed reservoir is configured such that, during operation of the pump, a volumetric flow rate of fluid within the pump is decoupled from a volumetric flow rate of fluid within a segment of the second fluidic pathway between the reservoir and the outlet of the second fluidic separator.

29. The fluidic system of claim 5, wherein the enclosed reservoir is associated with a sensor configured to detect an inflation status of the enclosed reservoir.

30. The fluidic system of claim 29, wherein the sensor comprises a light-sensitive component.

31. The fluidic system of claim 5, wherein the outlet of the second fluidic separator is a first outlet of the second fluidic separator, the second fluidic separator further comprises a second outlet, and the fluidic system further comprises a third fluidic separator fluidically connected to the second outlet of the second fluidic separator.

32. The fluidic system of claim 27, wherein at least a portion of the reservoir is removable from the fluidic system and/or wherein at least a portion of the reservoir is disposable.

33. The fluidic system of claim 27, wherein the reservoir is associated with a sensor configured to detect an inflation status of the reservoir.

34. The fluidic system of claim 27, wherein:
the reservoir has a maximum cross-sectional dimension;
the portion of the second fluidic pathway immediately upstream of the reservoir has a maximum cross-sectional dimension;
the portion of the second fluidic pathway immediately downstream of the reservoir has a maximum cross-sectional dimension; and
the maximum cross-sectional dimension of the reservoir is at least 3 times larger than the average of the maximum cross-sectional dimensions of the portions of the second fluidic pathway immediately upstream of the reservoir and immediately downstream of the reservoir.

35. The fluidic system of claim 28, wherein the enclosed reservoir is flexible.

36. The fluidic system of claim 28, wherein:
the enclosed reservoir has a maximum cross-sectional dimension;
the portion of the second fluidic pathway immediately upstream of the enclosed reservoir has a maximum cross-sectional dimension;
the portion of the second fluidic pathway immediately downstream of the enclosed reservoir has a maximum cross-sectional dimension; and
the maximum cross-sectional dimension of the enclosed reservoir is at least 3 times larger than the average of the maximum cross-sectional dimensions of the portions of the second fluidic pathway immediately upstream of the enclosed reservoir and immediately downstream of the enclosed reservoir.

37. The fluidic system of claim 28, wherein at least a portion of the enclosed reservoir is removable from the fluidic system and/or wherein at least a portion of the enclosed reservoir is transparent.

* * * * *